Sept. 16, 1952 G. T. RANDOL 2,610,521
AUTOMOTIVE POWER TRANSMISSION CONTROL
Filed Nov. 11, 1944 6 Sheets-Sheet 1
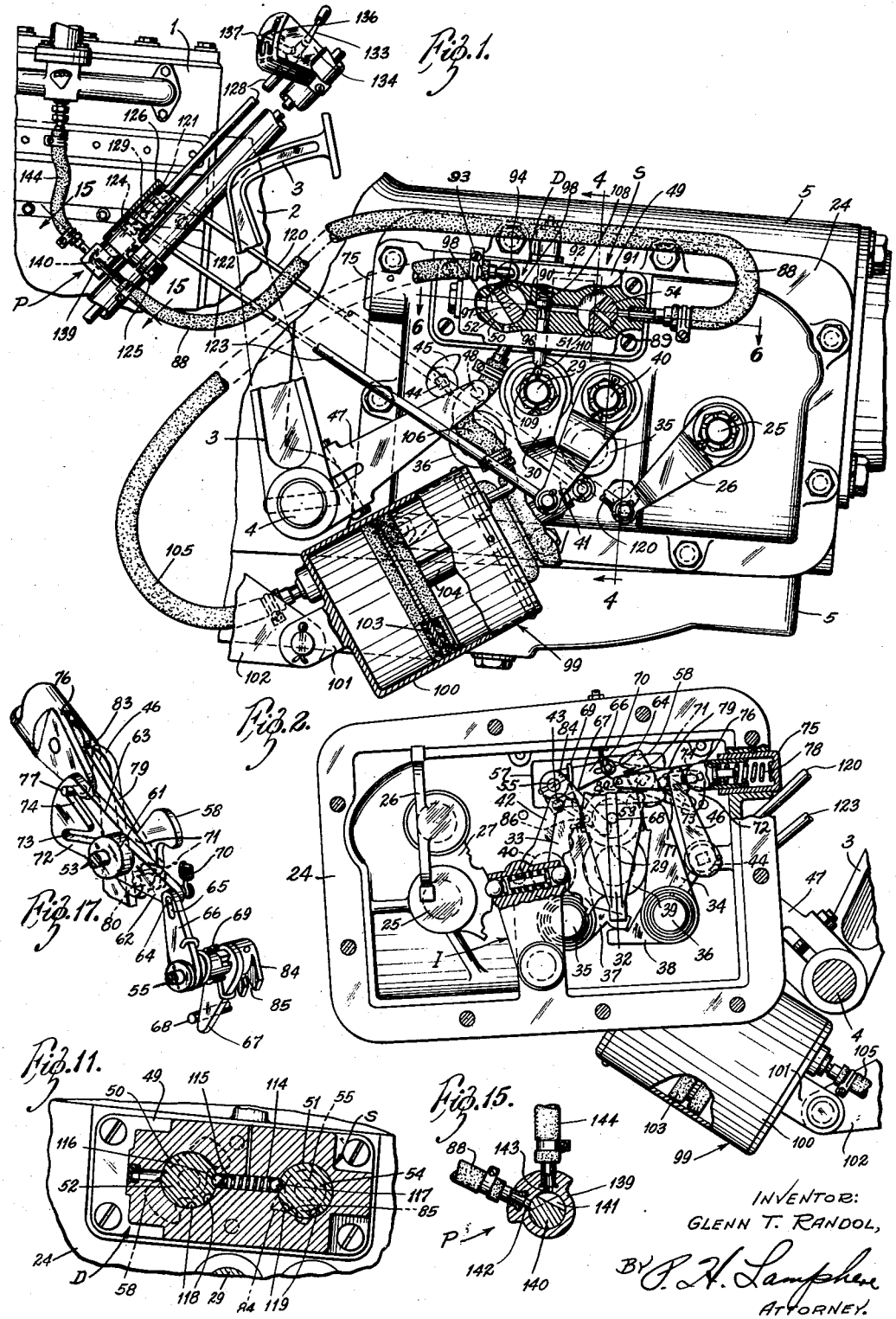
INVENTOR:
GLENN T. RANDOL,
BY
ATTORNEY.

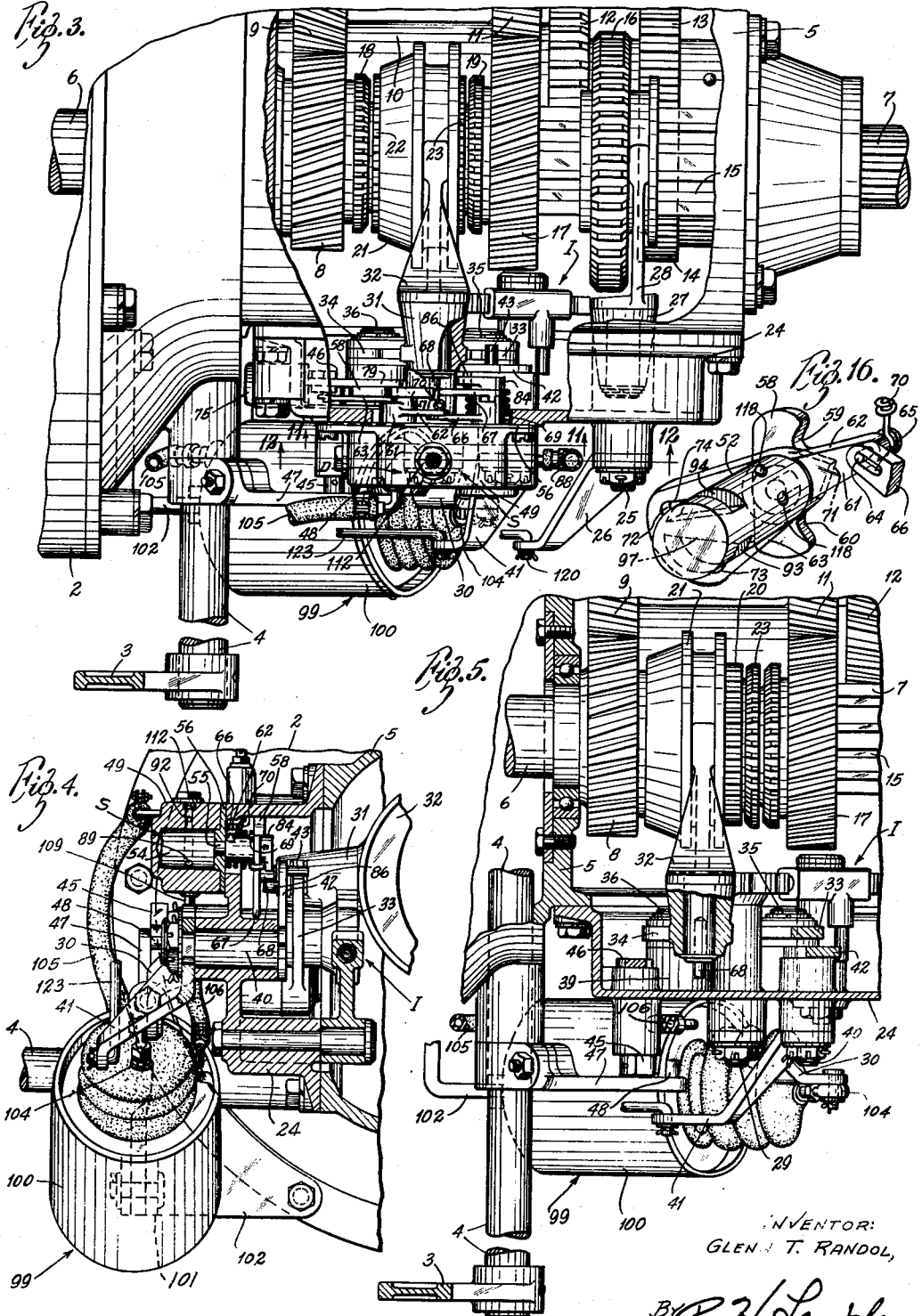

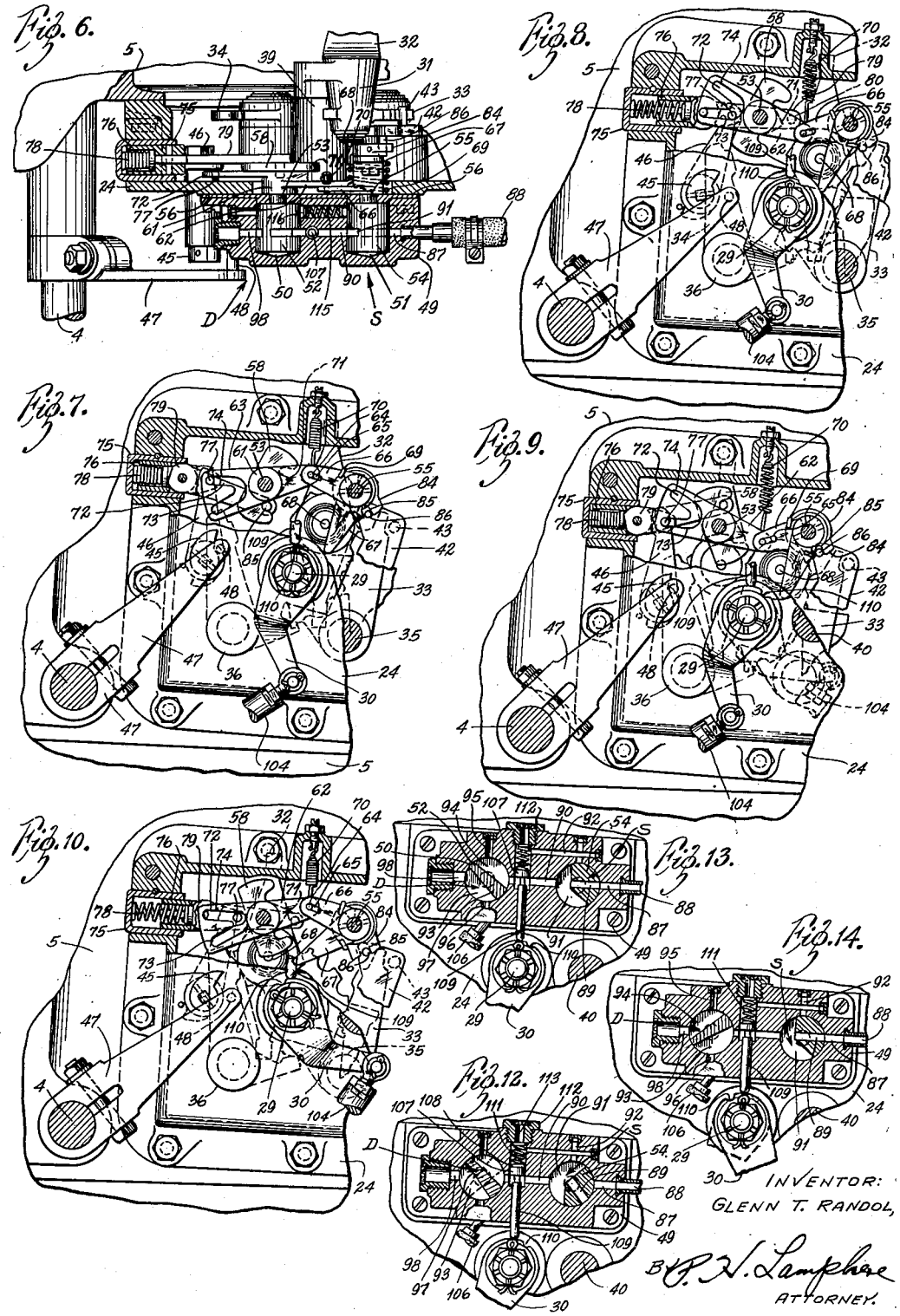

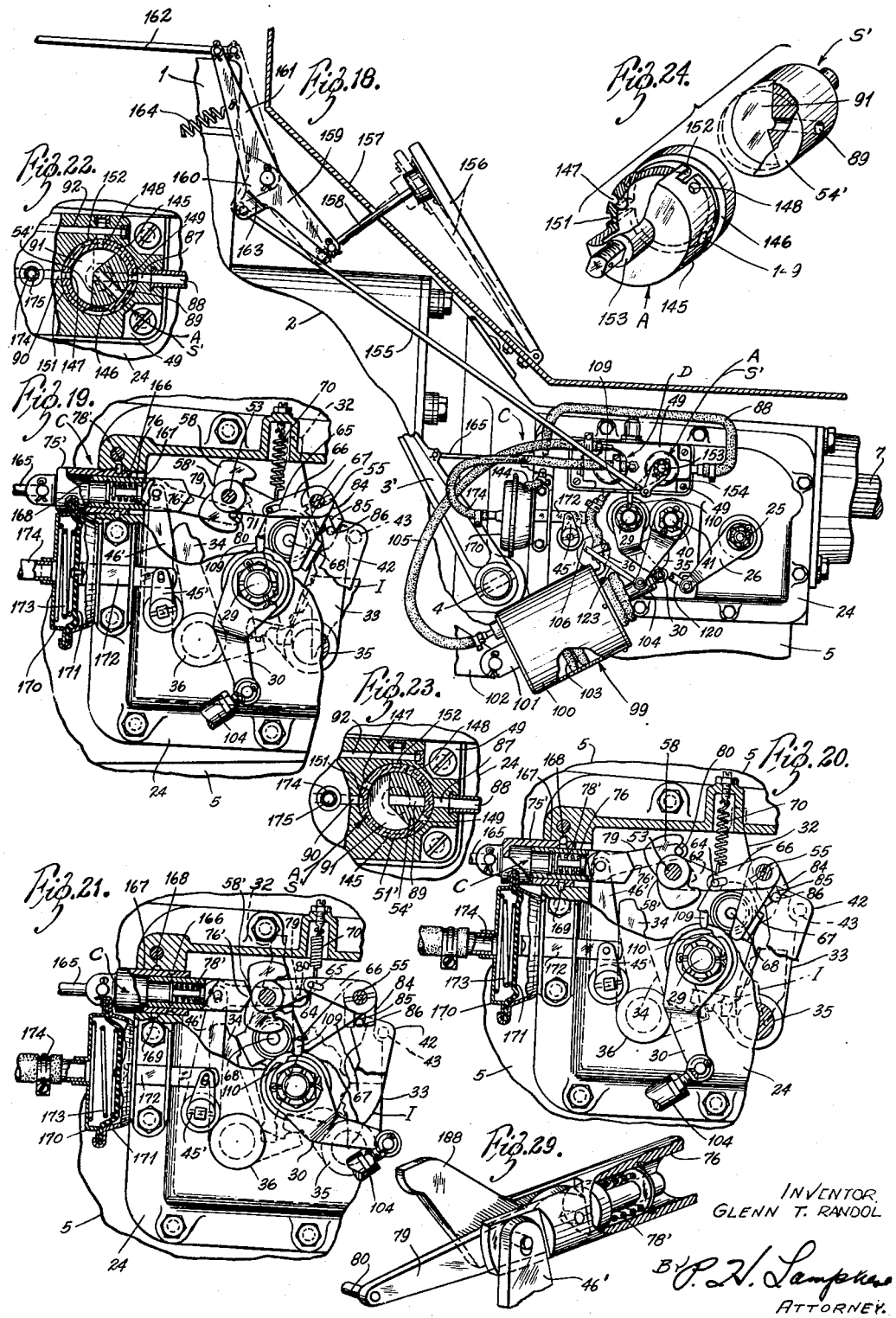

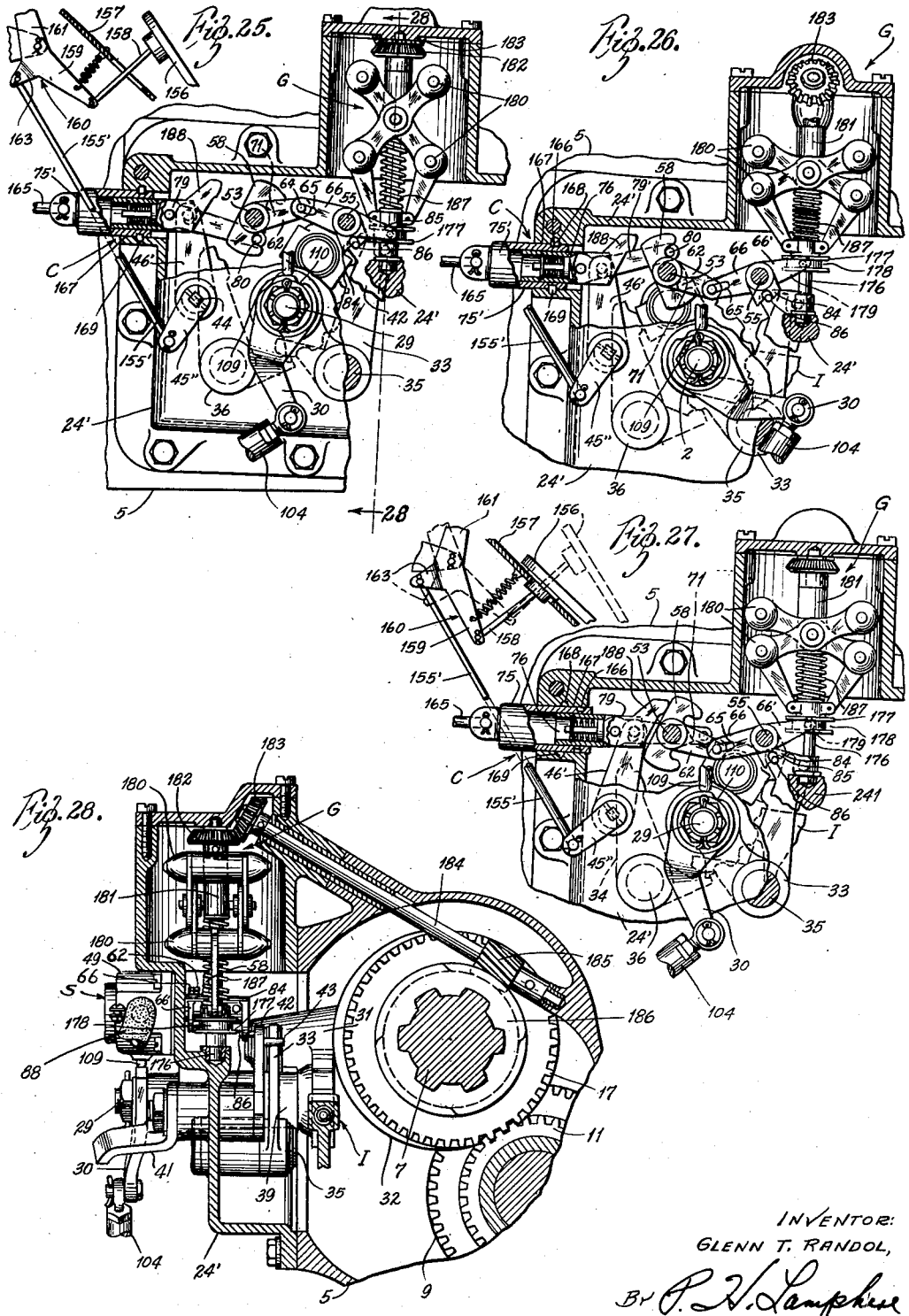

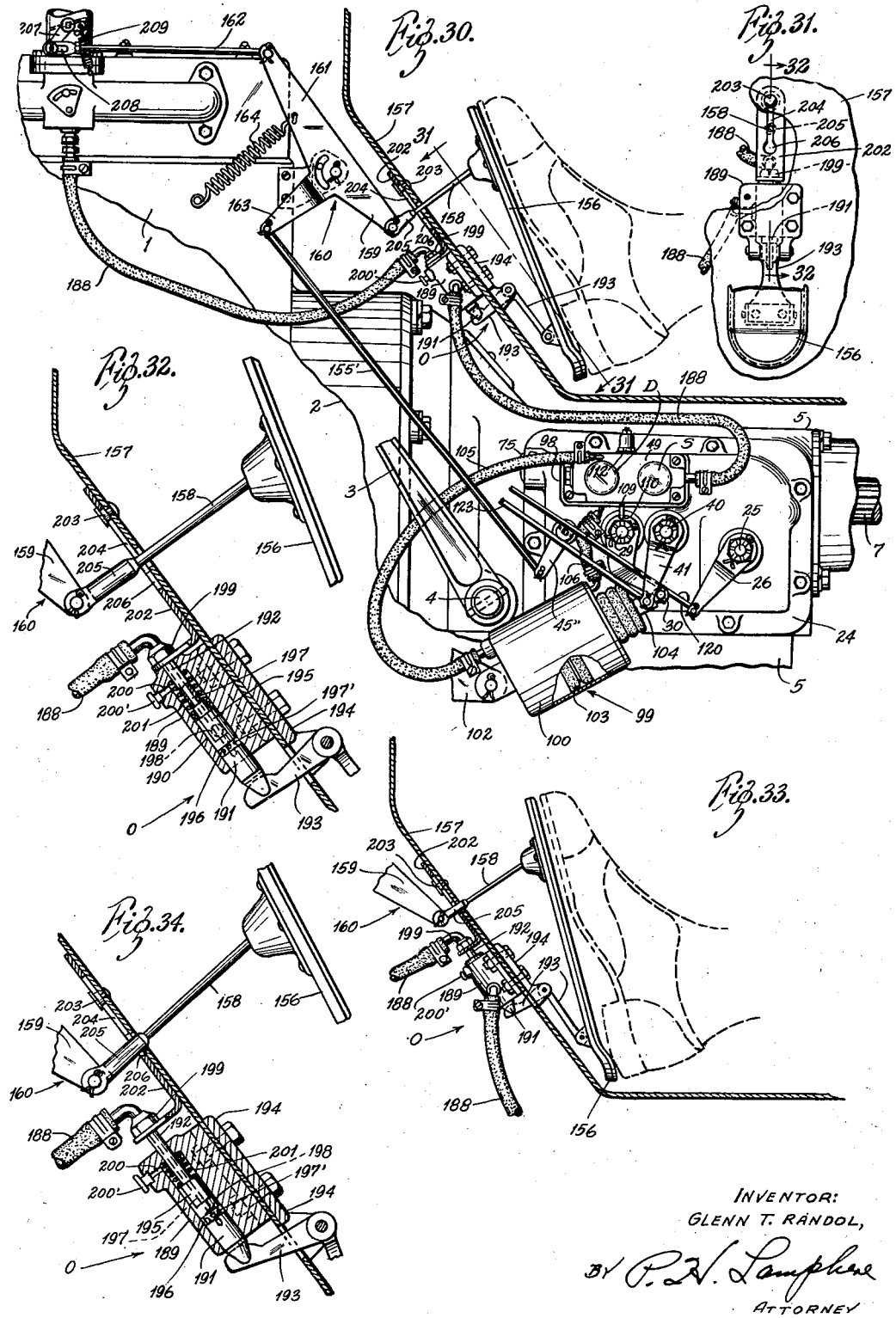

Patented Sept. 16, 1952

2,610,521

UNITED STATES PATENT OFFICE 2,610,521

AUTOMOTIVE POWER TRANSMISSION CONTROL

Glenn T. Randol, St. Louis, Mo.

Application November 11, 1944, Serial No. 563,063

37 Claims. (Cl. 74—472)

This invention relates broadly to change-speed power transmissions for automobiles and the like, and more particularly to improvements in the control apparatus therefor of the general character disclosed in U. S. Patent Re. 22,791, issued to me September 10, 1946, and in my earlier co-pending U. S. application Serial No. 539,215, filed June 7, 1944, in which the change-in-speed is effected by a reciprocatory piston-type fluid pressure actuated servomotor, said improvements being primarily concerned with the valvular system for such servomotors and novel means for effecting the control thereof.

One of the primary objects of the invention is to provide improved control means for a fluid pressure-operated motor employable to move a connected member to different predetermined positions.

Another object is to provide improved valve means and controls therefor for causing the movable element of a double ended fluid operated motor to be moved to certain predetermined positions.

A further object is to provide improved means to control a valve means for a double ended fluid operated motor which will accommodate a condition of the valve means to be established by a manually controlled member after said condition is predetermined by other means.

A further and more specific object is to provide a control means for the shiftable clutch and/or gear elements of a motor vehicle change speed gearing in which the change in gear drives is accomplished by a fluid operated motor with its valve means being under the control of the accelerator-operated controlling mechanism of an internal combustion engine associated with said gearing.

A further specific object related to that last stated is to provide a control means for a motor vehicle change speed gearing which will embody a double ended fluid operated motor and control valve means for performing the gear ratio changing thereof and having associated therewith speed responsive means for predetermining the establishable motor operative condition of the valve means together with means for establishing said operative condition by the accelerator-operated controlling throttle of the associated vehicle engine.

A further object is to provide improved means for selectively controlling the motor operative positions to which a valve may be moved.

A further and important object of my invention is to provide an improved valve mechanism and control therefor operable to pre-select the operation of a servo-mechanism and bringing the servo-motor into operation by a simple conscious effort of the operator.

A still further and more detailed object of my invention is to provide an operating and control means for a vehicle change-speed gearing, operable to shift from a lower to higher speed and vice versa upon preselection of the speed operating condition desired by a pre-selecting valve means and control therefor, and an operative action on the part of the operator when the change in speed is desired.

Another object of my invention is to provide a novel and improved form of control system and valving controlled thereby, particularly adapted for a vehicle change-speed gearing in which the shift from a lower to a higher speed and vice versa, may be automatically preselected in accordance with the speed of the vehicle, together with means operable to over-rule this automatic pre-selection at any time it is desired to shift from the higher speed when the vehicle is moving at speeds normally selecting said higher speed.

A still further object is to provide improved means for controlling the gear ratio changing of a vehicle change speed gearing wherein a double ended motor power cylinder and associated control valve means are employed to make the change in gear ratio, said improved means accommodating motor power operation of said valve means at the will of the vehicle operator.

A further object is to provide improved accelerator-operated throttle mechanism controlled shut-off valve means for use with a fluid motor operated means which will be normally closed during normal operation of said accelerator and may be opened at the will of the operator by an abnormal operation of said accelerator.

A further object is to provide an improved shut-off valve mechanism for control by accelerator-operated engine controlling mechanism, which will normally be closed during normal engine controlling operation of said accelerator by applying pressure at the toe-end thereof; but which can be opened only by a depressing movement of the heel-end of said accelerator.

Other objects of the invention will become apparent from the following description taken in connection with the accompanying drawings in which is shown by way of example only, control means for a change speed gearing, it being understood, however, that the control means can be employed to control other mechanisms wherein a member is to be moved to different positions by controlled motor power means.

In the drawings:

Figure 1 is a side view partly in section of portion of a motor vehicle including a change-speed gearing showing by way of example a control mechanism associated therewith and embodying my invention, the parts being in neutral gear position with the vehicle clutch engaged;

Figure 2 is a view of the inside of the gearing cover showing the gear changing control parts mounted thereon;

Figure 3 is a top plan view of the gearing and associated control mechanism, the gearing housing and control cover being broken away to show details of the mechanism therein;

Figure 4 is a vertical sectional view taken on the line 4—4 of Figure 1, and showing details of the mechanism for controlling the second and high gear shifting fork;

Figure 5 is a fragmentary view similar to Figure 3 but eliminating the control valve mechanism, and showing the gearing in high speed drive established condition;

Figure 6 is a longitudinal sectional view taken on the line 6—6 of Figure 1 showing details of the fluid motor valves and associated parts;

Figure 7 is a fragmentary view of the shifting mechanism mounted on the housing cover, said cover being partially broken away to show the parts carried on the inside thereof, and operated to positions corresponding to second speed ratio selected and established as a result of the main vehicle clutch being disengaged;

Figure 8 is a view similar to that of Figure 7 but showing the position of the shifting control parts when the engine clutch is allowed to engage;

Figure 9 is a view similar to Figure 8 but showing the position the shifting control parts will assume as a result of the engine friction clutch being disengaged to enable high speed ratio to be established when the fluid motor is operated (second speed ratio still established);

Figure 10 is a view similar to Figure 9 but showing the position the shifting control parts will assume in selecting second speed gear ratio when the friction clutch is engaged after high speed gear ratio is established;

Figures 11 and 12 are vertical sectional views through the distributing valve and the secondary shut-off valve positioned on the cover, said views being taken on the lines 11—11 and 12—12, respectively, of Figure 3;

Figures 13 and 14 are sectional views similar to Figure 12 but showing the shut-off valve element open and the distributing valve element in its two fluid motor operative positions, the position of Figure 13 corresponding to second gear ratio establishment and the position of Figure 14 corresponding to high gear ratio establishment;

Figure 15 is a sectional view through the primary shut-off controlled by the gear shifting lever, said view being taken on the line 15—15 of Figure 1;

Figure 16 is a perspective view of the distributing valve element and associated selecting means;

Figure 17 is a perspective view of the actuating and selecting assembly associated with the distributing valve element;

Figure 18 is a fragmentary side view of a motor vehicle change speed gearing control mechanism similar to that of Figure 1 but modified to accommodate shifting between second and high speed ratios by manipulation of the engine controlling accelerator mechanism, the parts being shown in positions corresponding to neutral condition of the gearing and the vehicle friction clutch disengaged so that the clutch controlled suction line shut-off valve is open;

Figure 19 is a view of the shifting mechanism mounted on and associated with the gearing housing cover, said cover being partially broken away to show the parts carried on the inside thereof and operated to positions corresponding to the vehicle clutch disengaged, second speed gear ratio established, and high gear ratio selected;

Figure 20 is a view similar to Figure 21 but showing the shifting control parts in positions corresponding to the vehicle clutch disengaged and the distributing valve moved to a position to cause high speed ratio to be established upon disestablishment of second speed drive;

Figure 21 is a view similar to Figure 20 but showing the position the shifting control parts assume when high speed ratio has been established and the vehicle clutch re-engaged, second speed ratio now having been selected;

Figure 22 is a sectional view of the secondary shut-off valve on the housing cover which is arranged to be additionally controlled by the engine accelerator of the vehicle, said valve being shown closed which corresponds to released position of the accelerator;

Figure 23 is a sectional view similar to Figure 22 but showing the open condition of said valve corresponding to the depressed position of the accelerator;

Figure 24 is a perspective view of the secondary shut-off valve elements which are controlled by either the accelerator mechanism or the gearing control mechanism;

Figure 25 is a fragmentary view of another modified gearing control mechanism wherein the distributing valve is arranged to be controlled by the accelerator mechanism and the selecting of the position to which the distributing valve element is to be moved in establishing a gear ratio, is controlled by a speed-responsive device, said view showing the control parts in position when second speed ratio has been selected by the speed-responsive device and then established by the release of the accelerator mechanism to engine idling position with the clutch pedal operated shut-off valve open;

Figure 26 is a view similar to Figure 25 but showing the position of the control parts when high speed ratio has been selected by the speed-responsive device and then established by the release of the accelerator as aforesaid;

Figure 27 is a view similar to Figures 25 and 26 but showing the position of the control parts when second speed gear ratio is established by a full depressing of the accelerator, notwithstanding the speed-responsive device is conditioned to normally select high speed gear ratio;

Figure 28 is a sectional view showing the speed-responsive device and its driving connection, said view being taken on the line 28—28 of Fig. 25;

Figure 29 is a perspective view of the distributing valve actuating assembly controlled by the acceleration mechanism;

Figure 30 is a fragmentary side view of another modified control mechanism in which the vehicle friction clutch is manually controlled, the distributing valve is controlled from the engine accelerator mechanism, and the primary shut-off valve is controlled by an abnormal movement of said accelerator;

Figure 31 is a plan view of the accelerator operated shut-off valve in normal closed position, said view being taken as indicated by the line 31—31 of Figure 30.

Figure 32 is an enlarged sectional view taken on the line 32—32 of Figure 31, showing the accelerator controlled primary shut-off valve in its normally closed position;

Figure 33 is an operated view showing the shut-off valve opened by depressing the heel-end of the accelerator pedal; and Figure 34 is an enlarged sectional view similar to Figure 32 but showing the open position of the shut-off valve corresponding to Figure 33.

*Control mechanism*
(Figs. 1 to 17 incl.)

The control means shown in Figures 1 to 17, inclusive, is identical for the most part to the control means disclosed in my reissued U. S. Patent No. 22,791, dated September 10, 1946, for Control Means for Change-Speed Transmissions. The present control means, however, embodies certain improved features for controlling the selection and operation of the distributing valve. The actuation of the distributing valve remains, however, under the control of the clutch pedal or equivalent member and functions in the same manner as illustrated and described in the above mentioned patent.

Referring particularly to Figures 1, 3 and 5, the numeral 1 indicates the internal-combustion engine for driving a motor vehicle, this engine being connected to the wheels of the vehicle by means of the usual friction clutch (not shown) enclosed within the housing 2 and by the change-speed gearing. The gearing is connected through suitable shafting and a differential gear (not shown) to the vehicle wheels as is the usual practice. A clutch pedal 3 secured to the outer end of a shaft 4 controls the engaging and disengaging of the clutch. The change speed gearing, which is comprised of a plurality of different gear sets capable of producing a corresponding series of speed gear ratio drives and is embodied in a housing 5 in which is journaled the driving shaft 6 (connected to the driven element of the clutch) and the axially aligned gearing driven shaft 7. The portion of the driving shaft within the gearing housing has secured thereto a gear 8 constantly meshing with a gear 9 of a cluster of gears mounted on a countershaft 10 journaled in the housing at one side of the driving and driven shafts. The cluster of gears, in addition to the gear 9, includes a second speed gear 11, a low speed gear 12, and a reverse speed gear 13, the latter being in constant mesh with an idler gear 14. A portion of the driven shaft 7 which extends into the housing is provided with splines 15 upon which is slidably mounted a combined low and reverse gear 16, said gear, when moved forward, meshing with the gear 12 to obtain low speed ratio, and when moved rearwardly, meshing with gear 14 to obtain reverse gear drive.

The driven shaft 7 ahead of the splined portion has rotatably mounted thereon a second speed gear 17 which is in constant mesh with the second speed gear 11 on the countershaft. The second speed gear 17 is connected to the driven shaft and the driven shaft is connected to the driving shaft in a selective manner by means of a combined toothed clutch and synchronizing means. This structure is well known and need only be briefly described. As best shown in Figures 3 and 5, clutch teeth 18 are provided on the driving shaft 6 and clutch teeth 19 are provided on the gear 17, said teeth being in opposed spaced relation. The portion of the driven shaft between the clutch teeth has secured thereto a splined sleeve 20 having thereon a slidable and non-rotatable clutch collar or shiftable member 21 provided with internal teeth for cooperating with teeth 18 when the sleeve is moved forwardly, or for cooperating with teeth 19 when moved rearwardly. The synchronizing means which is employed to bring either the teeth 18 or 19 and the internal teeth of the collar 21 to substantially the same speed to facilitate their engagement comprises a synchronizing member 22 associated with the driven shaft teeth 18 and a like member 23 associated with teeth 19 on the second speed gear. Thus when the collar is moved forwardly to engage teeth 18, the synchronizing member 22 will first frictionally connect the driving and driven shafts together, and then subsequently facilitate movement of the collar through the teeth of the synchronizing member to a position engaging teeth 18. Similarly, when collar 21 is moved rearwardly, synchronizing member 23 will be operated so as to frictionally connect gear 17 to the driven shaft and then subsequently enable the teeth of the clutch collar to pass through the teeth of the synchronizing member and engage teeth 19. In Figure 3 the clutch collar 21 is disengaged from both teeth 18 and 19 and in Figure 5 the clutch collar is shown as being moved forwardly to a position where the driving shaft is directly connected to the driven shaft.

The means for shifting the collar 21 and the combined low and reverse gear 16 in order to properly control the change of drive ratios of the gear will now be described. On the side closure plate 24 for the gear housing 5 there is journaled a shaft 25 (best shown in Figures 1, 2 and 3) which extends to the exterior of the closure plate and has pinned thereto an operating arm 26. To this shaft is secured, as by welding, an upwardly extending arm 27 in which is pivoted a shifting fork 28 engaging in an annular groove in the combined low and reverse gear 16. Thus when the arm 26 is moved to rotate shaft 25 in a counter-clockwise direction, as viewed from the exterior of the closure plate, shifting fork 28 will be so moved as to place the gear 16 in mesh with gear 12 to obtain low speed ratio, and when the arm is turned in the opposite direction, the shifting fork will move to cause gear 16 to be placed in mesh with the idler gear 14 to obtain reverse gear ratio.

Also journaled in the closure plate forwardly of the shaft 25 is a second shaft 29 and secured to the outer end thereof is a second arm 30 for rotating the shaft. The inner end of the shaft has secured thereto, as by welding, an upwardly extending arm 31 in which is pivotally mounted a shifting fork 32 engaging in a groove in clutch collar 21. Thus when the shaft 29 is rotated in a counter-clockwise direction, as viewed from the exterior of the closure plate, collar 21 will be moved forwardly to cause the driving shaft 6 to be connected directly to the driven shaft 7 to provide direct or high speed ratio, and when the shaft 29 is rotated in the opposite direction the collar will be moved rearwardly to cause gear 17 to be connected to the driven shaft to provide second speed ratio.

As best shown in Figure 2 (a view of the inside of the closure plate) the closure plate has mounted thereon two companion neutralizing levers 33 and 34 by means of pivot pins 35 and 36, respectively. These levers extend upwardly on opposite sides of arm 31 pivotally carrying the shifting fork 32. The lever 33 is provided with an integral arm 37 and lever 34 is provided with an integral arm 38, these arms extending toward each other and having their ends in overlapping relation with arm 37 lying above arm 38. By means of this construction, when the lever 33 is moved in a clockwise direction, as viewed in Figure 2, lever 34 will be caused to be moved in a counter-clockwise direction and toward the lever 33. The arms 37 and 38 lie directly below the boss 39 of shaft 29 and this boss is adapted to be engaged by arm 37 to limit the rotative movement of the two levers 33 and 34 away from each other. The extent of movement of the levers toward each other is limited by the shifting fork carrying arm 31 which lies between said levers. The levers are spread apart when fork 32 is moved from its neutral position in either direction to cause second and high speed ratios to be established. If the levers are moved toward each other when the fork is on either side of its central or neutral position, arm 31 will be engaged and the fork will be moved back to its central position. Thus it is seen that if the fork is in a position causing a speed ratio to be established, the gearing can be neutralized by the movement of the levers toward each other.

Also journaled in the closure plate is a shaft 40 which is positioned rearwardly of shaft 29 and above pin 35 upon which lever 33 is pivoted. The outer end of this shaft has secured thereto an arm 41. Also, the inner end of the shaft has secured thereto an arm 42 (see Figures 2, 4 and 5) which extends upwardly between the closure plate and the lever 33. Carried on this arm is a pin 43 for cooperation with the end of lever 33 whereby when shaft 40 is moved in a counter-clockwise direction, as viewed from the exterior of the closure plate, pin 43 will pick up lever 33 after a lost-motion movement and rotate it with arm 42, thus causing levers 33 and 34 to be moved toward each other.

At the forward end of the closure plate is journaled a shaft 44 having secured to its outer end a detachable short arm 45 and to its inner end an integral longer arm 46. Shaft 44 is adapted to be rotated in a counter-clockwise direction by means of clutch pedal 3, the structure for accomplishing this comprising an arm 47 secured to shaft 4 and extending upwardly adjacent the short arm 45. This arm carries a pin 48 for engagement with the arm 45. The relationship between arm 47 and arm 45 is such that the pin will not engage the arm 45 until the clutch pedal has been moved to a position just disengaging the clutch. Additional movement of the clutch pedal will cause rotation of arm 45 and also arm 46 in a counter-clockwise direction as viewed in Figure 1.

On the upper forward corner of the exterior of the closure plate 24 there is mounted a valve housing 49 provided with parallel bores 50 and 51 opening toward the gearing housing. In bore 50 there is positioned a cylindrical valve element 52 having an actuating extension 53 and in bore 51 there is positioned a cylindrical valve element 54 having an actuating extension 55. These valve elements are held in the bores by a plate 56 interposed between the valve housing 49 and the closure plate 24 which has an opening 57 through which the extensions 53 and 55 project. The valve controlled by valve element 52 will hereinafter be referred to as a distributing valve (generally indicated by the letter D) and the valve controlled by valve element 54 will hereinafter be referred to as the secondary shut-off valve (generally indicated by the letter S).

In accordance with one novel feature of my invention the inner end of extension 53 has secured thereto a double armed actuating member 58 formed with depressions 59 and 60 on the rear edges of the arms. See Figures 16 and 17. Loosely mounted on the extension 53 between member 58 and the plate 56 is a member 61 having oppositely extending arms 62 and 63. The arm 62 carries a pin 64 which is adapted to cooperate with an elongated slot 65 in the end of an arm 66 which is loosely mounted on the extension 55 of valve element 54. Also loosely mounted on the extension 55 is a second arm 67 which extends downward for engagement by a pin 68 carried by the end of the pivot portion of shifting fork 32 pivotally mounted in arm 31, previously referred to. The arms 66 and 67 are yieldably connected together by a coil spring 69 so that arm 67 can be rotated in a counter-clockwise direction (as viewed in Figure 17) relatively to arm 66 in the event arm 66 is held from rotation and also cause the arms to rotate together if arm 66 is not held. The extent of relative rotation is limited by interengageable parts (lug and recess) on the hubs of the arms (see Figures 3 and 17). A spring 70 is connected between the pin 64 and the top of the closure plate. This spring normally acts to pull the arms 62 and 66 upwardly in unison to the positions shown in Figure 10. Due to the lug and recess connection maintained by the coil spring between arms 66 and 67, the arm 67 will also be rotated by spring 70 to the position shown in Figure 10 if arm 67 is free to move. In the event arms 62 and 66 should be held in the positions shown in Figure 10 and the arm 67 engaged by the pin 68 on the shifting fork to the arm 67 can be moved to the position shown in Figure 7 by further energizing the coil spring 69. When the arms 62 and 66 are released the coil spring will then snap these arms to the positions shown in Figure 8 against the bias of spring 70 which is much weaker than the coil spring.

The arm 63 carries on its inner side a V-shaped selecting cam 71 which is arranged for operatively guiding a finger (to be described) into the depressions 59 and 60 on opposite sides of the double armed member 58. The arm 63 which is opposed to the arm 62 is formed with a V-shaped locking slot 72 having legs 73 and 74 diverging in the direction of its outer end and are employed under certain conditions for preventing rotation of the member 61 and the V-shaped selecting cam 71 carried by the arm 62.

In the upper front end of the closure plate there is mounted a sleeve 75, fixed against rotation, and slidable in this sleeve is a plunger 76 carrying a pin 77 (see Figure 17) for operation with the V-shaped locking slot 72. A spring 78 biases the plunger inwardly so that the pin will normally be at the juncture of the legs 73 and 74 of the locking slot and thus in a position to enter either leg. Pivotally mounted on the plunger which can be conveniently referred to as the actuating member for the double arm lever 58 and the valve element 52 is the selecting finger 79 which extends beyond the double arm member 58 and carries a pin 80 at its end for cooperation with the V-shaped selecting cam 71 and engagement in either of the recesses 59 and 60 of the member 58 depending on the position of the cam. When the plunger is biased outwardly by the spring 78 to the positions shown in Figures 8 and 10 it will be held in a horizontal position by the spring acting on a flat surface at the pivoted end of the finger. When the finger is in the position shown in Figure 8 which is its normally inoperative position, the pin 80 will be beyond the apex of the cam, as shown. The plunger 76 is arranged to be engaged and actuated by the upper end of the previously mentioned arm 46 which engages a shoulder 83 on the plunger. As already described arm 46 is actuated by the clutch pedal when moved beyond clutch disengaging position. The structure just described, and particularly the double arm oscillatable lever 58, comprises the selecting means for determining to which position the valve element 52 will be moved, which is the control element for determining which of the two speed ratios will be established upon operation of the power means to be described and shown as a fluid motor.

The projection 55 on the valve element 54 has secured thereto a short actuating arm 84 provided with a slot 85. This arm extends downwardly and alongside the upper end of arm 42 which, as previously described, is secured to and actuated by shaft 40. The arm 42 carries a pin 86 which can engage in slot 85 to actuate arm 84 and consequently the valve element 58. The end of arm 84 and the slot 85 are so formed that pin 86 will pick up the arm and actuate it only during a portion of the movement of arm 42. Thus when arm 42 is rotated in a clockwise direction from its normal inoperative position shown in Figure 1, it will move relatively to arm 84 and then pin 86 will engage slot 85 to pick up arm 84 and move valve element 54 to its open position as shown in Figures 7 to 10, 13 and 14.

As best shown in Figures 1, 6, 12, 13 and 14, the rear end of valve casing 49 is provided with a passage 87 for placing bore 51 in communication with a conduit 88 which is adapted to be placed in communication with a suitable source of fluid pressure or suction, such as, for example, the inlet manifold of the internal-combustion engine. The valve element 54 of shut-off valve S is provided with a cross passage 89 for connecting passage 87 with a passage 90 leading to bore 50. The valve element is also provided with a slot 91 whereby the passage 90 can be connected to an atmospheric passage 92 so that when the valve element is turned to a position wherein the cross passage 89 is out of alignment with passage 87, passage 90 will be in communication with the atmosphere. The normal inoperative position of the shut-off valve S corresponding to neutral position of the gearing is as shown in Figures 1 and 12 wherein passage 90 is connected to atmosphere through passages 92 and 98. When valve element 54 of valve S is rotated by arm 42, it will be in the position shown in Figures 13 and 14 wherein passage 90 is connected to conduit 88.

The valve element 52 (see Figure 16) in bore 50 is provided with two slots 93 and 94 whereby the valve element may cause the passage 90 to be connected to either passage 95 or passage 96 in the valve casing, depending upon the position of the valve element. The slots 93 and 94 are so formed as to leave a wedge-shaped portion 97 which can, when found desirable, shut off passage 90 and enable passages 95 and 96 to be in simultaneous communication with the atmosphere through a passage 98 which communicates with bore 50 opposite passage 90.

Positioned below the closure plate on the outside thereof is a fluid pressure-operated servomotor 99, herein shown as being of the suction type which is operably connected to actuate arm 30, and by means of shaft 29, the shifting fork 32 for controlling the second and high speed ratios previously described. The servo-mechanism which is shown, by way of example, as the power means for effecting speed changes in the transmission includes a cylinder 100 pivotally mounted by an extension 101 on a bracket 102 secured to the clutch housing 2. Within the cylinder is a piston 103 and secured thereto is a piston rod which is pivotally connected to arm 30. The piston 103 is positioned at the center of the cylinder when the shifting fork 32 is in its neutral position. The forward end of the cylinder is connected by means of a conduit 105 to the passage 95 in the valve casing, and the rear end of the cylinder is adapted to be connected by a conduit 106 with passage 96 of the valve casing associated with the distributing valve D. When the source of suction (engine intake manifold) is connected to the cylinder by conduit 105 and atmosphere is connected to the cylinder by conduit 106, the piston will be caused to move to the lower end of the cylinder and the shifting fork 32 will be so moved as to place the gearing in second speed ratio. When the source of suction is connected to the upper end of the cylinder and atmosphere is connected to the lower end of the cylinder, the piston will be moved to the upper end of the cylinder and cause the shifting fork to be moved to a position to cause the gearing to be in high speed ratio.

Passage 90 between bores 50 and 51 has associated therewith a valve element 107 lying in a bore 108 (see Figures 1, 12, 13 and 14). The valve element has an extension 109 which projects out of the valve housing 53 and cooperates with the hub of arm 30 secured to the outer end of shaft 29. This hub is provided with a small depression 110 into which the extension can move when arm 30 is in its neutral position. When the extension is in the depression 110, valve 107 is forced downwardly under the action of a spring 111 and thus restricts the flow of air through passage 90, the restricting position being shown in Figure 4. When arm 30 is in either of its second or high speed ratio positions, the hub of lever 30 will hold valve 107 in an upper position so as not to restrict the passage 90 (see Figures 9 and 12). The spring 111 is backed by a plug 112 having an opening 113 therethrough which places the bore in communication with the atmosphere. The passage 92, previously referred to as leading to the atmosphere, communicates with the atmosphere through the upper end of bore 108.

In order that the two cylindrical valve elements 52 and 54 may be yieldably held in their different operative positions, there is located in a bore 114 of the valve casing a spring 115 acting upon balls 116 and 117 (see Figures 6 and 11). Suitably positioned recesses 118 in the surface of the valve element 52 and other recesses 119 in the surface of valve element 54 cooperate with the balls and thus insure that the valve elements will be yieldably held in their different operative positions.

Referring now to Figure 1, the arm 26 on the exterior of the shaft 25 which controls the low and reverse speed shifting fork is operatively connected by a link 120 to an arm 121 mounted on the lower end of the steering column 122. Similarly, the arm 41 for rotating shaft 40 is connected by a link 123 with the arm 124 mounted on the steering column adjacent to arm 121. The mounting of arms 121 and 124 includes a bracket 125 secured to the steering column and provided with a bearing sleeve 126 in which the hubs of the arms are mounted. These hubs receive the lower end of a shift-control rod 128 which is both rotatable and longitudinally slidable. The rod carries a pin 129 which is adapted to selectively cooperate with slots (not shown) in the hubs of arms 121 and 124. Thus the rod 128 can be selectively connected with either of the arms 121 or 124 by a reciprocable movement in a well known manner. When either of these arms is connected to the rod it may be rotated to reciprocate the links connected to the arms.

The rod 128 extends upwardly along side the steering column to a point just below the steering wheel (not shown). Secured to this upper end is a handle 133. The upper end of the rod has bearing in a bracket 134 and a spring (not shown) cooperates with this upper end to normally bias the rod so that pin 129 at the lower end will be connected with arm 124. If it is desired to connect the lower end of rod 128 to arm 121, this is accomplished by raising up the handle 133 against the bias of the spring. The bracket 134 has a portion extending outwardly and in this bracket is a slot 136 in the form of a lower case h. The bracket is provided with four markings "H," "R," "N," and "L" to indicate the different selective conditions of the transmission as determined by the position of the handle 133. "H," "R" and "L" are opposite ends of legs of the slot, and "N" is at the center of the slot wherein the legs join each other. Cooperating with the h-slot is a pointer 137 which extends out from the hub of handle 133. For a more detailed showing of the steering column construction reference may be made to my U. S. Patent Re. 22,791. It is not believed necessary to show the details in this application in order to understand the invention.

The bracket 125 at the lower end of the steering column also has mounted thereon a primary shut-off valve P and as shown in Figures 1 and 15 this valve comprises a cylinder 139 mounted on the bracket 125 and a cylindrical valve element 140 connected to rotate with arm 124. This valve element is provided with a slot 141 for connecting two ports 142 and 143 in one position and disconnecting them when in another position. The port 142 is connected to conduit 88, previously referred to, and has the conduit connected to the intake manifold of the engine. The port 143 is connected to a conduit 144 which is connected to the engine inlet manifold. The valve 138 is normally in closed position except when arm 124 is rotated by handle 133 to a position to actuate the arm 41 in a clockwise direction.

There is also provided an interlocking mechanism for preventing low and reverse gears from being engaged whenever it is desired to employ the second and high speed gears and vice versa. This interlocking mechanism is shown in Figures 2 to 5 and is generally indicated by the letter I. The mechanism cooperates with the arms 27 and 31 carrying the shifting forks 28 and 32. It is not believed necessary to describe the mechanism in detail as it is well known and forms no part of the present invention. For a detailed description thereof reference may be made to my U. S. Patent No. Re. 22,791.

*Control operation*
(Figs. 1 to 17 incl.)

Referring now to the operation of my improved control mechanism, the parts thereof will be in the positions shown in Figures 1, 2, 3, 4 and 12 when the gearing is in neutral or inoperative condition. Under these conditions the pointer 137 associated with the shifting handle 133 will be opposite the point marked "N" on the bracket. The primary shut-off valve P will be closed as will also the secondary shut-off valve S. The distributing valve D may be in either of its two operative positions but irrespective thereof both ends of the fluid motor 99 will be connected to atmosphere since passage 89 is connected to atmosphere due to the closed position of shut-off valves P and S (see Figures 11 and 12). The selecting cam 71 will be in the position shown in Figure 10 being biased there by spring 70. This selected position will cause the double armed member 58 and the distributing valve element 52 to assume the positions in Figures 9 and 13 (if not already there) whenever the finger 79 is moved forwardly by the clutch pedal. Thus whenever the clutch pedal is moved beyond clutch disengagement the proper communication between the intake manifold and the suction motor 99 will be conditioned to cause the suction motor to first establish second speed ratio.

If it is now desired to place the gearing in reverse speed ratio, this is accomplished by depressing the clutch pedal (in order to disconnect the gearing from the engine) and then pulling up on the handle 133 and rotating it in a counter-clockwise direction as viewed by the driver. This will move the pointer 137 into the end of the leg marked "R." When the lever is pulled up, rod 128 is so positioned that it will be connected to arm 121 at the lower end of the steering column. Rotation of shaft 128 by the handle will result in arm 26 being rotated in a clockwise direction. This will cause the combined low and reverse gear to be moved rearwardly from its neutral or inoperative position and to a position wherein it can engage idler gear 14. Reverse gear ratio is now operative and if the clutch is re-engaged, the vehicle will be moved rearwardly. When the gearing is in reverse speed ratio, the interlock I will function to prevent any possibility of the high or second speed ratio shifting fork from being moved accidentally from its neutral position.

If it is desired to place the gearing in low speed ratio, the engine clutch is disengaged by depressing the clutch pedal and then the handle 133 so moved as to place the pointer in the end of the leg of the h-slot marked "L." This causes the arm 26 to be rotated in a counter-clockwise direction and thus moves the combined low and reverse gear 16 forwardly to a position wherein it engages the gear 12. The transmission is now in low speed ratio and when the clutch pedal is released to re-engage the clutch, the vehicle will be moved forwardly.

Thus it is seen that the combined low and reverse gear 16 is moved solely by manual effort in order to obtain either low or reverse speed ratio. This method of operation is not burdensome on the driver since these two speed ratios are not employed as often as the second and high speed ratios of the gearing.

When it is desired to employ second and high speed ratios the clutch pedal is depressed to such as extent as to disengage the clutch and to also move the clutch pedal beyond the disengaging position. This additional movement of the clutch pedal will result in the finger 79 being moved forwardly and since the V-shaped selecting cam 71 is in the position shown in Figure 10 the pin 80 on the selecting finger will be guided downwardly into the depression 60 of member 58 and then rotate said member 58 to the position shown in Figure 7 if the member is not already in said position, which it may not be, depending upon its position when the gear was neutralized. As the finger 79 is moved forwardly the pin 77 carried by the plunger 76 (to which the finger is pivoted) will ride into the leg 74 of the V-shaped slot 72 in the arm 63. The arm 63 is positioned so that the pin will move into the leg 74 since, as indicated in Figure 10, the member 61 and the selecting cam have been rotated upwardly by the spring 70. When the pin 77 enters the leg 74 the selecting cam will be locked, the locked position being shown in Figure 7. The rotating of the double arm member 58 by the finger to the position shown in Figure 7 will so position the valve element 52 of the distributing valve D that the forward end of the suction motor 99 will be placed in communication with the passage 90 and the rear end of said suction motor will be placed in communication with the atmosphere, all as indicated in Figure 13. The passage 90, however, will not be in communication with the engine inlet-manifold so that the suction motor can be operated because the secondary shut-off valve S is still in closed position as shown in Figures 1 and 2 due to the low speed ratio condition of the gearing. The same would be true if the gearing were in reverse gear or neutral condition. Also the primary shut-off valve P will still be closed, due to the fact that the gear shift handle pointer is in the "L" slot.

After the clutch has been disengaged and the clutch pedal moved beyond disengaged position, the gear shift handle is now moved from the end of the "L" slot to the "N" position and then to the end of the "H" slot. The movement to the "N" position will result in neutralizing of the low speed ratio by manual effort. The movement of the handle to the "H" position will open the primary shut-off valve P and thus place the intake manifold in communication with the conduit 88. The movement of the handle to "H" position also results in the rod 128 being disconnected from arm 121 and connected with the arm 124 and the latter rotated in such a manner as to cause the arm 41 on the outside of the cover plate to be rotated in a clockwise direction as viewed in Figure 1. This results in arm 42 secured to the interior of shaft 40 being rotated in a clockwise direction and to the position indicated in Figures 6 to 10. The pin 86 on lever 42 will move into slot 85 of the short arm 84 and rotate this arm so as to place valve element 54 of the secondary shut-off valve S in open position as shown in Figures 13 and 14. This places the cross passage 89 in the valve element in alignment with passage 87 to thus connect this passage and conduit 88 to passage 90.

As soon as both shut-off valves P and S are opened there will then be communication between the forward end of the suction motor and the manifold. Under these conditions the piston 103 of the suction motor is moved forwardly by the action of differential pressures and arm 30 is rotated in a clockwise direction as viewed in Figure 1. The movement of the arm causes the shifting fork 32 to be moved rearwardly and to carry with it collar 21, thus connecting gear 17 to the driven shaft and causing the second speed ratio to be established.

When the shifting fork 32 is moved rearwardly to establish the second speed ratio, pin 68 (carried by the fork) engages arm 67 and rotates this arm in a counter-clockwise direction from the position shown in Figure 10 to the position shown in Figure 7. This movement of the arm 67 is accommodated by the coil spring 69 and the lug and recess connection. The rotation of the arm 67, however, will not in any way effect the positions of the arms 66 and 62 which will remain in their positions as shown in Figure 7, due to the fact that they are held by the pin 77 being in the leg 74 of the V-shaped locking slot. As the shifting fork moves rearwardly it will also carry with it lever 33 of the companion levers.

If the clutch pedal is now released, the vehicle will be moved forwardly by power being transmitted through the second speed ratio. Release of the clutch pedal results in the release of the plunger 76 and when this plunger is released the spring 78 will cause the plunger to be moved rearwardly, carrying with it the pin 77 and the finger 79 so that the parts will assume the position shown in Figure 8. When the pin 77 reaches the juncture end of the leg 74, the arms 62 and 63 will be freed. When this occurs the coil spring 69 will then swing the arms 62 and 66 downwardly and the arm 63 upwardly to the positions shown in Figure 8. This will set the selecting cam 71 in high speed ratio selecting position so that the pin 80 on the end of the finger can be guided into the depression 59 of the double arm member whenever the plunger 76 and the finger are again moved forwardly. As long as second speed ratio is established, the distributing valve D will remain in the position shown in Figure 13 and the rear end of the suction motor will continue to be in communication with the engine inlet-manifold.

If it is now desired to place the change-speed gearing in high speed ratio; that is, direct-drive, all that is necessary is to depress the clutch pedal beyond clutch disengaging position and then release it. The handle 133 is not moved in any manner whatsoever. The depressing of the clutch pedal causes arm 47 to again move the plunger 76 to the left carrying with it finger 79. Since the apex of the V-shaped selecting cam 71 is now below pin 80 in horizontal relationship thereto, the pin will ride into depression 59 of the double arm member 58 and cause rotation of the distributing valve element in a counter-clockwise direction to the position indicated in Figure 14. Simultaneously the pin 80 will move into leg 73 of V-shaped slot 72 and lock the selecting cam in its lower position as shown in Figure 9. Figure 8 shows the position of the parts prior to depressing the clutch pedal and Figure 9 the position of the parts after depressing the clutch pedal. The new position of the distributing valve D will result in the front end of the power cylinder being placed in communication with the atmosphere and the rear end of the cylinder placed in communication with the inlet-manifold since the two shut-off valves P and S are still in open position. The piston of the power cylinder 99 will then move from the forward end to the rear end under the action of differential pressures and cause the gear shifting fork 32 to be moved to connect the driven shaft directly with the driving shaft.

As arm 30 is rotated by the power cylinder 99 from its second speed position to the high speed position, the depression 110 on the hub of the arm will pass beneath the extension 109 of the restricting valve 107. When arm 30 is in a position so that the extension is in the recess, the gear shifting fork will be in its neutral position wherein neither the second nor high speed ratios will be effective. The restricting valve 107 will always partially close off passage 90 under these conditions and thus cause the amount of air being drawn out of the upper end of the power cylinder to be diminished. Consequently, the piston will not move rapidly through the neutral gear movement thereof. This slows up the rate of movement of the shifting fork when it passes through neutral position. This is of considerable advantage since it provides sufficient time for the synchronizing elements associated with the cooperative clutch teeth to become operative and bring the speeds of the teeth to approximate synchronization and thereby produce easier engagement. If there were no slowing of the rate of movement of the shifting fork from second speed position to high speed position, excessive wear in the synchronizing means would result.

When the clutch pedal is released, the vehicle can be driven in high speed ratio. Release of the clutch causes plunger 76 to be again retracted to the rear to the position shown in Figure 10. The movement of the shifting fork to the high speed position moves its second speed ratio operative position to the high speed ratio operative position. Thus gear 17 is disconnected from the driven shaft and the pin 68 away from arm 67 and, consequently, since release of the clutch has unlocked the selecting cam, spring 70 will move arms 66 and 62 in unison and the apex of the V-shaped selecting cam 71 to a point above pin 80 in horizontal relationship thereto, all as also shown in Figure 10. When the plunger is now again moved to the left, pin 80 will move into engagement with depression 60 and rotate valve element 52 of the distributing valve D to the position shown in Figure 7. The movement of the shifting fork to the high speed position also carries with it the lever 34. Thus both neutralizing levers 33 and 34 will be spread apart as shown in Figures 7 to 10.

If, in driving the vehicle in high speed ratio, a condition is encountered wherein it is desired to again obtain second speed ratio, as for example, in negotiating an upgrade or after slowing down at a road intersection, all that need be done to obtain second speed ratio is to again depress the pedal 3 beyond clutch disengaging position. This will cause plunger 76 to be moved to the left, thereby operating the valve element 52 of the distributing valve in a manner already described to cause the suction motor 99 to shift the connected shifting fork to the second speed position. The restricting valve 107 will be operative during the period that the shifting fork moves through neutral position, thus slowing down the rate of movement of the shifting fork to accommodate operation of the synchronizing means. When the clutch pedal is released, the parts will again assume the position shown in Figure 8. Subsequent depression of the clutch pedal will result in placing the transmission in high speed ratio. Thus it is seen that the operator of the vehicle can alternately obtain second and high speed ratios as desired by merely depressing the clutch pedal. He need not at any time touch the handle 133 on the steering column. When the gearing is in high speed ratio, the only gear ratio which will probably be subsequently used in normal forward driving will be second speed ratio. If the gearing is in second speed ratio, the speed ratio most likely to be used next is high speed ratio and this is obtained by merely depressing the clutch pedal. Thus it is seen that the two speed ratios which are used most in forward driving are easily obtained without the use of any movement of the hand, only by a de-clutching and re-clutching operation. If it is desired to disengage the clutch without performing any shifting operation, the clutch pedal 3 need only be moved to a position wherein the clutch is just disengaged. This will only bring the arm 47 into initial engagement with arm 45 without imparting any movement to the parts actuated thereby.

When the handle is moved so as to place the pointer in the end of the leg marked "H" of the slot, second speed ratio will always be first obtained since the spring 70 normally positions the V-shaped selecting cam so as to cause the finger to rotate element 52 of the distributing valve D to the position wherein the fluid motor 99 will move the shifting fork to cause second speed ratio to be operated.

When shifting handle 133 is in a position wherein the pointer indicates "H" and it is desired to neutralize the gearing, this can be accomplished by merely returning the handle to the "N" position after the clutch is disengaged. This causes arm 41 to be rotated back to its position as indicated in Figure 1. Initial counter-clockwise rotation of arm 42 first rotates shut-off valve element 54 to a position wherein passage 90 is cut off from passage 87 and connected to atmosphere by way of passage 92. Thus the power cylinder 99 has both ends connected to atmosphere and no differential pressure is effective on the power piston notwithstanding the distributing valve element 52 is so positioned that one end of the cylinder would be connected to the source of suction if the valve element 54 were not shut off. At this point pin 86 begins to disengage from slot 85 of valve operating arm 84 since further rotation of valve element 54 is unnecessary and pin 43 now picks up lever 33 and moves it in a counter-clockwise direction as viewed in Figures 7 to 10. The connection between lever 33 and companion lever 34 causes the latter lever to move in a clockwise direction. In other words, the levers are moved toward each other. If the shifting fork 32 should be in high speed condition, as shown in Figure 10, the movement of the lever 34 will cause the shifting fork to be moved to its neutral position. Similarly, if the shifting fork is in second speed position, as shown in Figures 7 to 9, the movement of lever 33 will pick up the shifting fork and move it to its neutral position. Thus when shifting handle 133 is moved to the indicated neutral position, the power cylinder will be disabled by both shut-off valves being closed and the gearing will be positively neutralized.

From the above description of my improved change-speed gearing control mechanism it is seen that the structure is simple in operation and construction. The control mechanism eliminates all hand-shifting for second and high speeds, thus leaving the operator free to employ his hands for steering the vehicle or for other purposes. Also, the control mechanism is so arranged that whenever the shifting handle is moved to the position marked "N," the driver will know that the gearing is in neutral position. Thus there is no possibility of the driver not knowing the condition of the transmission; that is, whether it is neutral or in a gear ratio operative position. Since present change-speed gearings of the conventional type now have such second gear ratios that it is very seldom necessary to use low speed ratio except on heavy pulls, the control mechanism provides for substantially all the shifting to be performed by merely operating the clutch pedal. To start the vehicle the driver need only place the handle 133 so that the pointer is in "H" position. Second gear will then be caused to be operative when the clutch is depressed. When it is desired to place the transmission in high speed ratio, it is only necessary to depress the clutch pedal. Thus it is seen that when there are no heavy pulls the operator need only make the initial setting of the handle and then perform the necessary shifting operations by merely depressing the clutch pedal to a point beyond the position wherein the clutch is disengaged.

*Modified control mechanism and operation*
(Figs. 18 to 24 incl.)

Referring to Figures 18 to 24 there is shown a modified control mechanism whereby the accelerator mechanism is employed to control a shut-off valve between the engine intake manifold and the distributing valve. This accelerator mechanism controlled shut-off valve is associated with the previously described secondary shut-off valve S in the control mechanism shown in Figures 1 to 17, inclusive. The two combined shut-off valves will now be generally indicated by the letters A and S'.

The previously mentioned bore 51 in the valve casing 49 is replaced by a larger bore 51'. Rotatably mounted in this bore is a sleeve valve element 145, said element being the control element for the accelerator mechanism controlled valve A. Rotatably mounted within sleeve valve element 145 is the valve element 54' of the secondary shut-off valve S'. This valve element 54' is provided with a passage 89 and a slot 91 in the same manner as the previously described valve element 54 of shut-off valve S employed in the mechanism of Figures 1 to 17. Valve element 54' is controlled in a manner already described. Thus the passage 89 will be aligned with the passage 87 whenever the gearing is in neutral, low or reverse speed ratios. When the gearing is in second or high speed ratios, the valve element 54' will be so rotated that the passage 89 will be out of alignment with the passage 87 and the slot 91 will be positioned so as to connect the passage 90 with the passage 92 leading to the atmosphere.

The valve element 145 is provided with an annular groove 146 and to one side of this groove the element is provided with circumferentially spaced holes 147, 148 and 149, the holes 147 and 149 being directly opposite each other and the hole 148 lying between the holes 147 and 149 and spaced approximately 90° from each hole. Also in the surface of the valve element are two axial slots 151 and 152. These slots are 90° apart with the slot 151 being positioned adjacent the hole 147 and the slot 152 being positioned adjacent the hole 148. The slots 151 and 152 are arranged to communicate with groove 146 which provides a communication between the slots.

Valve element 145 is provided with an extension 153 which extends to the exterior of the valve casing and secured to the outer end of the extension is an arm 154 to which is connected a rod 155 for actuation by the accelerator mechanism. The accelerator mechanism is of usual construction comprising a pedal 156 pivotally mounted to the floorboard 157 of the vehicle and connected by a rod 158 to an arm 159 with a three-armed lever 160. The arm 161 of this lever is connected to the rod 162 which in turn is connected to operate the throttle valve of the carburetor (not shown). The third arm 163 of the lever is connected to the rod 155 coming from the accelerator controlled shut-off valve A. A spring 164 acts upon the three-arm lever to normally bias the accelerator pedal to its release or engine idling position.

When the accelerator pedal is in its released position, as shown in Figure 18, then under these conditions the hole 147 will be aligned with the passage 90, the hole 148 will be in communication with the atmospheric passage 108 and the hole 149 will be aligned with the passage 87, all as shown in Figure 22. If, under these conditions, the secondary shut-off valve S' is in its open position (Figure 23), which it will be if the gearing is in second or high speed ratios, then the passage 87 will communicate with the passage 90. However, if the gearing is in neutral, low or reverse speed ratios, then the valve element 54' will be turned to such a position that the passage 87 cannot communicate with the passage 90, but the passage 90 will be in communication with the atmosphere through slot 91 (see Figure 22). If the accelerator mechanism is moved to speed up the engine by depressing the accelerator pedal, then the valve element 145 will be given a clockwise rotation as viewed in Figure 18 so that it will assume the position shown in Figure 23. Under these conditions the holes 147, 148 and 149 will be moved out of alignment with the passages 90, 92 and 87, respectively, so as to cut off any communication between the passage 87 and either the passages 90 or 92. The passages 90 and 92 will, however, be in communication with each other since now the slot 151 is opposite passage 90 and slot 152 is opposite the entrance to passage 92, it being noted that the two slots communicate with each other through the groove 146.

Thus it is seen that with the combined accelerator shut-off valve element 145 and the secondary shut-off valve element 54', communication will only be effective through the valves between the passage 87 and the passage 90 when the gear shifting handle is placed in the "H" position and the accelerator pedal is fully released. If the accelerator pedals is depressed the valve element 145 will cut off communication between the passages 87 and 90 or if the gearing is in neutral, low or reverse speed ratios the shut-off valve element 54' will cut off communication between the passages 87 and 90.

In order to be sure that a speed change will not take place between second and high speed ratios except when it is desired by the operator to make a shift, there is also provided an additional shut-off valve C which is interposed in the conduit 88 leading from the valve casing 49 to the intake manifold. This shut-off valve C is arranged to be controlled by the clutch pedal 3' and is to be opened only when the clutch pedal is moved to a position beyond clutch disengaging position. The valve C is incorporated in the forward end of the gear housing cover plate. In place of the fixed sleeve 75 of the structure described in Figures 1 to 17, there is mounted a slidable sleeve 75' which sleeve still supports the plunger 76 by which the finger 79 is moved to operate the distributing valve D. Spring 78' is employed to bias the finger to a normally horizontal position only. This sleeve 75' is connected by a rod 165 to the clutch pedal 3'. The sleeve is provided with an annular groove 166 and the bore 167 in which the sleeve is slidable is also provided with ports 168 and 169, 168 being connected to the portion of the conduit 88 which leads to the valve casing 79 and the port 169 being connected to that portion of the conduit 88 which leads to the inlet-manifold. The groove 166 in the sleeve will place the ports 168 and 169 in communication with each other when the clutch pedal is placed in a position beyond clutch disengaging position as shown in Figure 19 and 20. When the clutch is engaged there will be no communication through the valve since the sleeve is out of position to connect the ports 168 and 169, all as shown in Figure 21.

Instead of having the distributing valve actuating finger 79 moved by a mechanical connection between it and the clutch pedal, the finger is shown in this modified construction as being actuated by a small suction motor 170 mounted on the forward end of the cover plate. The diaphragm 171 of this motor is operatively connected by a link 172 to the arm 45'. The arm 46' on the inside of the cover plate which is actuated by the arm 45' has its upper end pinned to the plunger 76. A spring 173 constantly acts on the diaphragm of the suction motor. Since the arm 46' is pinned to the plunger, this spring will serve as a means for returning the finger rearwardly to its normally inoperative position whenever the suction in the suction motor is released. The spring also has the added function of moving the valve element 52 of the distributing valve D to its shut-off position corresponding to the double-armed member 58 being in a vertical position. To accomplish this the plunger 76 has a V-shaped end which can engage in a V-shaped recess 58' in the edge of the double-armed member as the plunger moves rearwardly. With the distributing valve in a shut-off position both ends of the suction motor 99 are connected to atmosphere and the piston of the motor 170 will not interfere with manual neutralization of the gearing. The suction motor is connected by a conduit 174 to a port 175 in the passage 90. Thus whenever suction is present in the passage 90 it will also be effective in the suction motor 170 and when atmospheric pressure is present in the passage 90 it will also be present in the small suction motor so as to release the spring 173 to move the diaphragm and finger rearwardly.

From the above description it is believed to be obvious as to the manner in which this modified control mechanism operates. When the gear shifting handle is set in "H" position with the clutch pedal depressed and the accelerator pedal released, there will be an immediate establishment of second speed drive since the suction motor 99 will be operated due to the forward end of said motor being in communication with the manifold of the engine, it being noted that all the shut-off valves C, S' and A are now open. When the clutch is engaged the valve C will be closed. This will cut off the source of suction but will not connect passage 90 to atmosphere. However, upon depressing the accelerating pedal valve element 145 will be turned to the position shown in Figure 23 and then at this time there will be a venting of the passage 90 and the suction motor 170 to atmosphere. Spring 173 will now be effective to cause the return of the actuating finger 79 to its normally inoperative position as shown in Figure 21.

The selecting cam functions in the same manner as described in connection with the control mechanism shown in Figures 1 to 17. Thus with second speed established, high speed ratio will be selected by the cam so that when the clutch pedal is again depressed, with the accelerator pedal released, there will be a functioning of the suction motor 170 to bring about proper operation of the distributing valve to cause a shift from second speed to high speed drive. Release of the clutch pedal and depressing the accelerator pedal will then condition the mechanism so that second speed is selected and ready to be established whenever again the clutch pedal is depressed beyond the clutch disengaged position with the accelerator pedal released.

With this modified control mechanism there is no possibility of making a shift when such is not desired. A mere releasing of the accelerator pedal will not cause a shift because it takes the depressing of the clutch pedal in conjunction with release of the accelerator to bring about a shift. Also rod and lever connections are eliminated for actuating the distributing valve so that the unit may be located at remote points from the operator controls without unduly complicating the control hook-up or reducing the operating efficiency.

*Modified control mechanism and operation*
(Figs. 25 to 29 incl.)

Referring to Figures 25 to 29, inclusive, there is disclosed a further modified control mechanism wherein the accelerator mechanism is employed to actuate the distributing valve and the selection of the position to which the distributing valve element is to be moved is automatically controlled by a speed-responsive device or governor. Most of the shifting mechanism, already described, remains the same and the structure thereof is designated by the same reference numerals.

The double-armed member 58 secured to the inner end of the extension 53 of the distributing valve element 52 is actuated by the finger 79 pivotally mounted upon the plunger 76, which plunger is slidable in the sleeve 75' forming part of the shut-off valve mechanism C employed in the control mechanism shown in the Figures 18 to 24 previously described. The plunger is controlled by the arm 46' which has its upper end pinned to the plunger so that the plunger will at all times move with the arm. The shaft 44 which carries this arm and extends to the exterior of the cover plate has secured thereto the arm 45" which is connected by the rod 155' to the accelerator mechanism, said mechanism being the same as the accelerator mechanism described in the previous control mechanism.

With this structure, it is seen that when the accelerator pedal is in the released position, plunger 76 will be moved forwardly so that the finger 79 operates the valve element 52 of the distributing valve. When the accelerator pedal is depressed, the plunger is moved rearwardly from the positions of Figures 25 and 26, so that the finger 79 may be positioned to be connected to the other arm of member 58 if there has been a selection made by the selecting cam 71.

The selecting cam 71 is mounted on the arm 62 as in the previously described structure. However, the locking mechanism for this cam is eliminated so that the cam can be moved at any time irrespective of the position of the plunger 76. The arm 62 is pivotally connected to the arm 66 which is rotatably mounted on the extension 55 of the valve element 54 for the shut-off valve S. The arm 66 has an extension 66' which is adapted to be operatively connected to a governor G. Thus it is seen that if the arm 66' is moved up or down the selecting cam 71 will be moved therewith.

The governor G comprises a shaft 176 vertically journalled in the cover plate 24'. Rotatable upon this shaft is a sleeve 177 having a groove 178 for receiving a pin 179 carried on the end of the arm 66'. This sleeve is linked to two centrifuge members 180 which are pivotally mounted upon a sleeve 181 fixed for rotation with the shaft 176. The upper end of the shaft 176 carries a beveled gear 182 which meshes with a beveled gear 183 carried on a driving shaft 184, this driving shaft being driven from the driven shaft 7 of the gearing by means of suitable gears 185 and 186. A spring 187 surrounds the governor shaft 176 and normally biases the sleeve 177 downwardly to hold the centrifuge members in their inner positions adjacent the shaft as shown in Figure 25. This is the normal position of the governor when the vehicle is not moving or is moving at a low rate of speed.

As shown in Figure 25, when the centrifuge members are in their inner positions the selecting cam 71 will be in its upper position and thus under these conditions with the accelerator released into engine idling position, the valve element of the distributing valve will be so positioned that second speed ratio will be established in the event the shut-off valves C and S are both open.

When the vehicle is moving at a sufficient speed the centrifuge members will be so thrown outwardly by centrifugal force that the apex of the selecting cam will be moved below the horizontal line of the finger. Such a vehicular speed may be for example, 20 miles per hour. This will cause a selection to be made so that if the accelerator is again released from a depressed position finger 79 will be moved to connect with the upper end of the double arm member 58 and thus move the valve element of the distributing valve to a position to cause high speed ratio to be established whenever the suction motor 99 is operated. Operation of the suction motor 99 can be brought about at will whenever the clutch is disengaged to open the shut-off valve C, it being noted that the shut-off valve S is already open since the gearing was previously in second speed ratio.

When the control mechanism shown in Figures 25 to 29 is employed, high speed ratio will only be selected when the vehicular speed is at or above the predetermined speed. Thus a shift cannot be made from second speed ratio to high speed ratio until the vehicular speed dictates such a speed ratio change and then a change can be accomplished only at the will of the operator, since to bring about a shift the accelerator must be released and the vehicle clutch disengaged.

There are conditions wherein it is desirable to shift from high speed ratio to second speed ratio even though the vehicle is traveling at a speed above 20 miles per hour. Necessity for such a shift may be presented when it is desired to pass another vehicle. In order that the operator can make the shift from high speed ratio to second speed ratio at any time he so desires, the plunger 76 (shown in detail in Figure 29) is provided with an upstanding integral arm 188 which is arranged to engage and actuate the double-arm member 58 of the distributing valve element upon a movement of the plunger rearwardly, such movement of the plunger being accomplished by substantially full depressing of the accelerator. Thus, if it should be desired to make a shift from high speed ratio to second speed ratio when the selecting cam is positioned as shown in Figure 26, then the shift will be made by fully depressing the accelerator as shown in Figure 27. This will cause the arm 188 on the plunger to move rearwardly and engage the upper arm of the member 58 and cause it to be swung from the high speed ratio position shown in Figure 26 to the position in Figure 27. This will now condition the distributing valve so that if the shut-off valve C is opened by a movement of the clutch pedal, there will be a shift from high speed ratio to second speed ratio. When it is desired to shift back to high speed ratio, all that need be done is release the accelerator pedal and open the shut-off valve C after disengaging the clutch. Since the vehicle is moving at a speed greater than 20 miles per hour, the selecting cam 71 will be properly positioned to cause the member 58 to be moved to the position shown in Figure 26 when the accelerator pedal is released. Thus with the control structure shown in Figures 25 to 29 there will be automatic selection in accordance with the speed of the vehicle, but this automatic selection may be over-ruled at any time if it is desired to make a shift from high speed ratio to second speed ratio with the vehicle moving at such a speed that the automatic selection is not such as to select the second speed ratio position for the distributing valve.

*Modified control mechanism and operation*

(Figs. 30 to 34 incl.)

Figures 30 to 34, inclusive, show still another modified control mechanism which is somewhat similar to that of Figures 25 to 29 but with the clutch pedal operated shut-off valve C replaced by an accelerator mechanism operated shut-off valve. All the structure mounted on the cover plate and associated with the gearing is the same as previously described. The actuating finger 79 is actuated by the accelerator pedal through the connecting rod 155' and the arm 45". The control of the selecting cam 71 may be accomplished in either the manner shown in the structure of Figures 1 to 24, inclusive, or by a governor in accordance with the structure shown in Figures 25 to 29, inclusive. As shown, however, the selection is accomplished in accordance with the speed ratio which is established, that is, in accordance with the structure shown in the control mechanisms of Figures 1 to 24, inclusively. All previously described parts are identified by the same reference numerals.

In place of the clutch pedal operating valve C of the control mechanisms shown in Figures 18 to 24 and 25 to 29, there is provided a shut-off valve O which is attached to the under side of the floorboard 157 and arranged to be controlled by an abnormal movement of the accelerator pedal 156. This shut-off valve O is interposed in the conduit 188 which leads from the valve housing 24 to the intake manifold of the engine.

As best seen in Figures 32 and 34, the shut-off valve O has a casing 189 provided with a flange secured as by bolts to the underneath side of the angular portion of the vehicle floorboard. This casing is provided with a bore 190, in which is reciprocally mounted a valve element 191 having a portion extending from the rear of the bore and a reduced tubular portion 192 extending from the front of the bore. This valve element is arranged to be actuated by a bell crank lever 193 which is pivoted on a bracket 194 secured to the top of the floorboard opposite the flange on the valve casing 189. The bell crank lever has one arm operably connected to the rear extending portion of the valve element and its other arm pivotally connected to the heel-end of the accelerator pedal 156. Thus by the bell crank lever 193 the valve element 191 may be moved in the bore 190 by depressing the heel-end of the accelerator pedal.

The valve element 191 is provided with a flat portion 195 and an annular groove 196. The annular groove is connected at all times with the vacuum created in the engine intake manifold by a portion of conduit 188 and an axial passage 197 which extends through the reduced tubular extension 192 of the valve element to a point slightly beyond the groove 196. The annular groove 196 connects with a port 198 leading to the surface of the valve casing 189 when said valve element is moved to its open position shown in Figures 33 and 34 and when said valve element is moved to its closed position shown in Figure 32 the annular groove 196 is disconnected from port 198 and said port 198 is placed in communication by flat portion 195 with atmospheric port 200 having a breather cap 200'. Thus, in closed position vacuum is cut off from the control valves D and S and atmospheric pressure admitted through said valves into the power cylinder.

The tubular extension 192 is connected by a fitting 199 to the portion of the conduit 188 which leads to the inlet-manifold and the other portion of the conduit 188 is connected to the port 198 (shown in dotted lines) on the side of the valve element 191. A fairly strong spring 201 acts on the valve element 191 to normally bias it to its outward cut-off position shown in Figure 32. The valve element when in this position has its annular groove 196 disconnected from the port 198, thus cutting off communication between the engine manifold and the valves D and S through conduit 188. If the valve element should be pushed inwardly from the position shown in Figures 30, 31 and 32 to the position shown in Figures 33 and 34, communication through the conduit 188 will be established since the annular groove 196 will be moved into alignment with the port 198 and the flat portion 195 disconnected therefrom. The flat portion 195 is employed to bleed off the vacuum from valves D and S and the power cylinder when the shut-off valve O is in its cut-off position.

Further attention is directed to the construction whereby the annular groove 196 always remains in communication with vacuum from the engine intake manifold. This is brought about by connecting the annular groove 196 and the axial passage 197 by series of circumferentially spaced radial passages 197'. However, the annular groove 196 will be moved to the cut-off position whenever the port 198 is placed in communication with the flat portion 195 so that the portion of the conduit 188 between the valves D and S and the shut-off valve O may be in communication with the atmosphere.

Secured to the outer end of the tubular extension 192 is a plate 202 arranged to slide on the bottom surface of the angular portion of the floorboards 157. This plate is held in sliding engagement with the floorboard surface by a shouldered pin 203 which extends through a slot 204 in the plate and is riveted to the floorboard. This slot 204 receives the rod 158 connecting the accelerator pedal 156 to the three-armed lever 160 and is of a width only slightly greater than the diameter of the rod. The rod 158 has an over-size portion 205 which cannot pass through the slot. However, to accommodate this over-size portion the lower end of slot 204 has an enlarged circular portion 206. This enlarged portion, when the valve element is in its normally closed position, is out of alignment with the enlarged portion of the rod and thus this enlarged portion cannot pass through the slot. However, when the valve element is moved to its open position, as shown in Figures 33 and 34, the enlarged end 206 of the slot 204 will be positioned in alignment with the enlarged portion of the slot and a hole of similar size in the floorboard proper so that the rod can slide therethrough.

When the enlarged end 206 of the slot registers with the enlarged portion 205 of the rod 158 so that said rod can freely pass therethrough, spring 164 acting on the three-armed lever 160 will bring about this movement with some assistance from the operator's heel pressure on the extreme lower end of the accelerator pedal to open the valve. To accommodate this movement, the rod 162 at its end where it connects onto the arm 207 of the carburetor is provided with a lost-motion slot 208, the carburetor butterfly valve being operated to closed position by spring 209. Thus the movement of the lever 160 which occurs when the enlarged portion of the rod 205 moves through the slot opening 206 will have no effect in changing the normally closed position of the throttle valve of the carburetor, or disturbing the selection setting of valve element 58.

The shut-off valve O being normally closed prevents suction being effective in the suction motor 99, the connected end of the motor being determined by the condition of the distributing valve D. The accelerator pedal, when in normally released position shown in Figures 30 and 32, is effective in operating the distributing valve as the actuating finger is moved forwardly sufficiently to move the member 58. Thus the distributing valve is selectively placed in its operative position when the operator releases the accelerator, but to make the selected shift the operator must depress the heel-end of the accelerator pedal. When this is done the valve element of the shut-off valve O is moved to the position shown in Figures 33 and 34. Communication from the manifold to the suction motor 99 will now be established according to the selective positioning of the element 58 of distributing valve D by the accelerator pedal when the upper or toe end of the pedal moves to its extreme released engine idling position as shown in Figures 33 and 34. When the valve element 191 reaches the position shown in Figures 33 and 34 the enlarged end 206 of the slot 204 will then be in registry with the enlarged portion 205 of the rod to freely move therethrough. The toe end of the accelerator pedal will thus be "kicked" backwardly and the three-arm lever 160 given such a movement in a counter-clockwise direction that the valve element of the distributing valve will be slightly additionally operated by the actuating finger, but not to such an extent as to disturb the selective position thereof. Thus with the distributing valve so positioned the suction motor 99 can now be operated to perform the shifting to change the selected speed ratio. When a shift is desired the engine clutch must be disengaged. This clutching operation is performed before depressing the heel of the accelerator pedal. To complete the shift the heel-end of the accelerator must be depressed. When this is done the enlarged portion 205 of the rod 158 will move into the enlarged end 206 of the slot 204 and the hole in the floorboard, and the spring 201 in the shut-off valve will immediately be effective to lock the valve in this position, as shown in Figures 33 and 34, and thus connect the inlet manifold with the suction motor 99 whereby it will be operated to bring about the shift according to the selective condition of valve D. When the clutch pedal is released to engage the clutch the vehicle may be driven forwardly.

From the foregoing description of the modified control mechanism of Figures 30 to 34, it is seen that the entire control of the shifting is accomplished by the manipulation of the accelerator pedal. When the accelerator pedal is normally released no shift can be accomplished. The spring 201 is of such strength that the normal weight of the heel of the operator will not actuate the cut-off valve to cause a shift to occur. Whenever a shift is desired the heel-end of the accelerator pedal is depressed and then the toe-end of the accelerator is normally depressed to operate the engine throttle whereupon the next releasing of the accelerator pedal to positions shown in Figures 30, 31 and 32 will automatically select the next gear position of valve element 54. Then the heel-end of the accelerator pedal is again depressed to open the cut-off valve O, causing the power cylinder 99 to engage the selected gear. The toe-end of the pedal is next depressed to release the shut-off valve O and normally operate the engine throttle. The principal object in having the novel lock mechanism is to be able to sustain the valve O in open position with the foot removed from the pedal and to prevent accidental speeding of the engine during a speed-changing operation. With this lock mechanism, under no conditions can the toe and heel be effective simultaneously to operate the accelerator pedal. With valve O locked in open position when the toe-end is operated to speed up the engine, the lock is instantly released causing the heel portion to "snap" into normal shut-off position. Release of spring 201 causes this action. In normal operation of the car the lock may be "skipped." This will be done when the operator depresses the heel-end causing the shift to occur and then quickly depressing the toe-end of the pedal. When the car is parked and the hand lever set in "N" position, the heel-end of the pedal is not depressed since both ends of valve 58 are connected to atmosphere. The inactive side of valve 58 is connected to atmosphere by reason of its position and the active side through valve S and port 200 of valve O.

It is thus seen that all the shifting between second and high speed ratios can be accomplished by the feet of the operator, one foot operating the clutch pedal and the other foot causing an abnormal operation of the accelerator pedal. There will be no danger of making a shift when such is not desired, due to the fact that to make the shift it is necessary to produce an abnormal pressure on the heel of the accelerator in order to compress the spring 201 and open the cut-off valve; nor can the engine throttle be opened above engine idling speed by the toe during the aforesaid shifting cycle, as the heel operation locks the accelerator pedal against toe operation, or vice versa. The operator will know when the cut-off valve has been opened since as soon as the valve element 191 is moved to the position shown in Figure 33 the spring 164 will be effective to "kick" the toe end of the accelerator pedal slightly upwardly against the foot of the operator.

The modified control mechanism of Figures 30 to 34 is particularly well adapted to a vehicle employing a fluid coupling between the engine and the change speed gearing. With such a coupling it will not be necessary to disengage the engine from the gearing during shifting and therefore the shift can be made without any operation of a friction clutch. With such an arrangement the entire shifting between second and high, both up and down, can be done by merely manipulating the one foot which is employed to actuate the accelerator pedal.

It will be understood that other modifications and variations will be readily apparent to those skilled in the art from the preceding description of presently preferred embodiments of the invention which are for illustrative purposes only, and it is not intended to limit the invention in its broader aspects except as set forth in one or more of the claims appended hereto.

I claim as my invention:

1. In a control mechanism for a change-speed multiple gear drive transmission provided with a member shiftable to two positions to establish only two of said gear drives, motor power means for shifting said member to its two gear drive establishing positions, a control means including an element having two motor operative positions for determining which gear ratio said power means will establish when operated, a member movable from one position to another for moving said control element and having an idle return movement, selecting means acted upon by the control element moving member for predetermining to which position the control element will be moved, means for operating said selecting means and means associated with said movable member and selecting means for locking said selecting means in its selecting position while said movable member is being moved from said one position to said other position and return.

2. In a control mechanism for a change-speed multiple gear drive transmission provided with a member shiftable to two positions to establish only two of said gear drives, motor power means for shifting said member to its two gear drive establishing positions, a control means including an element having two motor operative positions for determining which gear drive said power means will establish when operated, a member movable from one position to another for moving said control element and having an idle return movement, selecting means including an oscillatable element for predetermining to which position said control element will be moved, means for operating said selecting means, and means for preventing operation of said oscillatable element of the selecting means except when said movable member is in said one position.

3. In a control mechanism for a change-speed multiple gear drive transmission provided with a member shiftable to two positions to establish only two of said gear drives, motor power means operable for shifting said member to its two gear drive establishing positions, a control means including an element having two motor operative positions for determining which gear drive said power means will establish when operated, actuating means for moving said control element, selecting means controlled by the movement of said shiftable member for predetermining to which position said control element will be moved by said moving means when actuated, and means controlled by said actuating means when actuated to move said control element for preventing said selecting means from being controlled as aforesaid notwithstanding said power means has shifted the shiftable member to a selected gear drive establishing position determining another gear drive selection.

4. In valve mechanism for controlling the moving of a movable element of a fluid pressure operated motor to two different positions, a source of fluid pressure different from atmosphere, conduit means between said motor and source, a control valve associated with said conduit means and having an element movable to two different open positions for controlling the operation of said motor, means controlled by movement of said movable element for selecting the open position to which said valve element will be moved, means including a second fluid pressure operated motor operatively connected for moving said valve element to either of its said open positions, and other valve means associated with said conduit means for controlling the operativeness of said second fluid motor.

5. In valve mechanism for controlling the movable element of a fluid pressure operated motor to two different positions and being associated with a motor vehicle internal combustion engine controlled by an accelerator-operated throttle mechanism, a source of fluid pressure different from atmosphere, conduit means between said motor and source, a control valve associated with said conduit means and having an element movable to two different open positions for controlling the operation of said motor, means controlled by movement of said movable element for selecting the open position to which said valve element will be moved, actuating means for moving said valve element to either of its said positions, and means for causing said actuating means to move when said accelerator is in a predetermined engine controlling position.

6. In control mechanism for a change-speed multiple gear drive transmission provided with a member shiftable to two positions to establish only two different gear drives, a source of fluid pressure different from atmosphere, a fluid pressure operated motor operatively connected to shift said shiftable member to either of its gear drive establishing positions, conduit means between said motor and source, a control valve associated with said conduit means having an element movable to two different open positions for controlling the operation of said motor, an oscillatable double arm lever connected to said valve element, a reciprocable actuating finger for selective connection with said arm to selectively place said valve element in either of its open positions when actuated, a selecting cam associated with said oscillatable lever and finger for predetermining to which arm said finger will be connected, means for controlling the selecting position of said cam, a second fluid pressure operated motor operatively connected to move said actuating finger, and other valve means associated with said conduit means for controlling the operativeness of said second fluid motor.

7. In control mechanism for a change-speed transmission having at least two gear sets provided with a member shiftable to two positions to establish two different gear drives, said transmission being associated with an internal-combustion engine controlled by an accelerator-operated carburetor throttle; energizable motor-power means operable for shifting said member to either of its gear drive establishing positions; means for energizing said motor including a control element selectively movable to two motor energizing positions for determining which gear drive said motor will establish when operated; selecting means controllable for predetermining to which energizing position said control element will be moved; means for controlling said selecting means; a movable actuating member for moving said control element; and means controlled by said accelerator during an engine controlling operation thereof, for causing said actuating member to move said control element to its selected energizing position and thus cause said motor to effect the establishing of the corresponding gear drive.

8. In control mechanism for a change-speed transmission having at least two gear sets provided with a member shiftable to two positions to establish two different gear drives, said transmission being associated with an internal-combustion engine controlled by an accelerator-operated carburetor throttle; energizable motor-power means operable for shifting said member to either of its gear drive establishing positions; means for energizing said motor including a control element selectively movable to two motor energizing positions for determining which gear drive said motor will establish when operated; selecting means controllable for predetermining to which energizing position said control element will be moved; means for controlling said selecting means; a movable actuating member for moving said control element; means for disabling said control means; and means controlled by said accelerator during an engine controlling operation thereof for operating said disabling means.

9. In control mechanism for a change-speed transmission having at least two gear sets provided with a member shiftable to two positions to establish two different gear ratio drives, said transmission being associated with an internal-combustion engine controlled by an accelerator-operated carburetor throttle; a fluid pressure motor operatively connected to shift said shiftable member to either of its gear drive establishing positions; a source of fluid pressure different from atmosphere; conduit means for connecting the motor to said source; a control valve having an element movable to two positions for determining which gear ratio drive will be established by said motor when operated; means for selecting the position to which said control element will be moved; means for selectively moving said control element; disabling means interposed between said source and control element; and means controlled from said accelerator during an engine controlling operation thereof for controlling said moving and disabling means.

10. In control mechanism for a change-speed transmission having at least two gear sets provided with a member shiftable to two positions to establish two different gear drives, said transmission being associated with an internal-combustion engine controlled by an accelerator-operated carburetor throttle; energizable motor-power means operable for shifting said member to either of its gear drive establishing positions; means for energizing said motor including a control element selectively movable to two motor energizing positions for determining which gear drive said motor will establish when operated; selecting means controllable for predetermining to which energizing position said control element will be moved; means for controlling said selecting means; means for moving said control element; and dual operator-operable means for sequentially or simultaneously controlling the operativeness and inoperativeness of said power means by its control means.

11. In control mechanism for a change-speed transmission having at least two gear sets provided with a member shiftable to two positions to establish two different gear drives, said transmission being associated with an internal-cambustion engine controlled by an accelerator-operated carburetor throttle; energizable motor-power means operable for shifting said member to either of its gear drive establishing positions; means for energizing said motor including a control element selectively movable to two motor energizing positions for determining which gear drive said motor will establish when operated; selecting means controllable for predetermining to which energizing position said control element will be moved; means for controlling said selecting means; means for moving said control element; operator-operable means for controlling the operativeness and inoperativeness of said power means by its control means; and means operable by said accelerator during an engine controlling operation thereof for also controlling the operativeness and inoperativeness of said power means by its control means.

12. In control mechanism for a change-speed transmission having at least two gear sets provided with a member shiftable to two positions to establish two different gear ratio drives, said transmission being associated with an internal-combustion engine controlled by an accelerator-operated carburetor throttle; a source of fluid pressure different from atmosphere, a fluid pressure motor operatively connected to shift said shiftable member to either of its gear drive establishing positions; conduit means for connecting the motor to said source; a distributing valve interposed in said conduit for controlling the shifting operations of said motor; means for controlling said valve; a manually-controlled shut-off valve interposed in said conduit between said first-named valve and source, a second shut-off valve interposed in said conduit in series with said first-named shut-off valve; and means for controlling said second shut-off valve by said accelerator during engine controlling operations thereof.

13. In control mechanism for a change-speed transmission having at least two gear sets provided with a member shiftable to two positions to establish two different gear drives, said transmission being associated with an internal-combustion engine controlled by an accelerator-operated carburetor throttle; energizable motor-power means operable for shifting said member to either of its gear drive establishing positions; means for energizing said motor including a control element selectively movable to two motor energizing positions for determining which gear drive said motor will establish when operated; means for moving said control element at will; selecting means for predetermining to which motor energizing position said control element will be moved; and other means controlled by placing said accelerator in an engine controlling released position for causing said motor to operate when said control means is in one of its energizing operative positions.

14. In control mechanism for a change-speed transmission having at least two gear sets provided with a member shiftable to two positions to establish two different gear drives, said transmission being associated with an internal-combustion engine controlled by an accelerator-operated carburetor throttle; energizable motor-power means operable for shifting said member to either of its gear drive establishing positions; means for energizing said motor including a control element selectively movable to two motor energizing positions for determining which gear drive said motor will establish; means for selectively moving said control element at will; selecting means for predetermining to which energizing position said control element will be moved; and other means controlled by said accelerator for causing said motor to function when said control element is moved by said moving means to one of its energizing positions.

15. In control mechanism for a change-speed transmission having at least two gear sets provided with a member shiftable to two positions to establish two different gear ratio drives, said transmission being associated with an internal-combustion engine controlled by an accelerator-operated carburetor throttle; a fluid pressure motor operatively connected to shift said shiftable member to either of its gear drive establishing positions; a source of fluid pressure different from atmosphere; conduit means for connecting the motor to said source; control valve means associated with said conduit means and having an element movable to two open energizing positions for controlling the operation of said motor; means for actuating said valve means, selecting means for predetermining to which position said last-named element will be moved by said actuating means when actuated; other valve means associated with said conduit means; and means for controlling said other valve means by said accelerator.

16. In control mechanism for a change-speed transmission having at least two gear sets provided with a member shiftable to two positions to establish two different gear ratio drives, said transmission being associated with an internal-combustion engine controlled by an accelerator-operated carburetor throttle; a fluid pressure motor operatively connected to shift said shiftable member to either of its gear drive establishing positions; a source of fluid pressure different from atmosphere; conduit means for connecting the motor to said source; valve means associated with said conduit means and having an element movable to two open energizing positions for controlling the operation of said motor, means for actuatnig said valve means; selecting means for predetermining to which position said last-named element will be moved by said actuating means when actuated, other valve means associated with said conduit means; and means for opening said other valve means when said accelerator is placed in engine idling released position.

17. In control mechanism for a change-speed gearing provided with a member shiftable to two gear meshing positions to thereby establish two different speed drives, said gearing being drivingly connected to an internal-combustion engine controlled by a treadle-operated throttle device; motor-power means for shifting said member to establish either of said speed drives; control means for said motor including a movable element having two motor operating positions for determining which speed drive said motor will establish when operated; means for selecting to which operating position said valve element will be moved; means for moving said valve element to its selected operating position by said treadle when placed in normally released engine idling position; and means for causing said motor to operate by an abnormal movement of said treadle.

18. In control mechanism for a change-speed gearing provided with a member shiftable to two gear meshing positions to thereby establish two different speed drives, said gearing being drivingly connected to an internal-combustion engine controlled by a treadle-operated throttle device; motor-power means for shifting said member to establish either of said drives as aforesaid; control means for said motor including a movable element having two motor operating positions for determining which speed drive said motor will establish when operated; means for selecting to which operating position said element will be moved; means for moving said element to its selected operating position by a movement of said treadle to its normally released engine idling position; means for causing said motor to be disabled or operative; and means for controlling said last-named means through manipulation of said treadle.

19. In control mechanism for a change-speed gearing provided with a member shiftable to two gear meshing positions to thereby establish two different speed drives, said gearing being drivingly connected to an internal-combustion engine controlled by a foot-operated device; motor-power means for shifting said member to establish either of said speed drives as aforesaid; control means for said motor including a movable element having two motor operating positions for determining which speed drive said motor will establish when operated; means for selecting to which operating position said element will be moved; means for moving said element to its selected operating position by a normal releasing movement of said control device; and means controlled, while said control device is in its released position, by an abnormal movement of the heel-end of said control device for causing said motor to operate in accordance with the operating position of said control element, said last-named means being controllable to disable said motor when said control device is being normally operated by movements of its toe-end.

20. In control mechanism for a change-speed gearing provided with a member shiftable to two gear meshing positions to thereby establish two different speed drives, and being drivingly associated with an internal-combustion engine controlled by a carburetor throttle operated by a foot-treadle; motor-power means for shifting said member to establish either of said speed drives as aforesaid; control means for said motor including an element having two motor operating positions for determining which speed drive said motor will establish when operated; means for selecting to which operating position said element will be moved; means for moving said element by a normal engine controlling movement of said treadle; means for causing said motor to operate by an abnormal movement of said treadle; and means for locking said last-named means in its motor operating position.

21. In control mechanism for a change-speed gearing provided with a member shiftable to two gear meshing positions to thus establish two different speed drives, said gearing being drivingly associated with an internal-combustion engine provided with a throttle operating mechanism controlled by a foot-operated treadle; a source of fluid pressure different from atmosphere; a fluid pressure motor operatively connected to shift said shiftable member to establish either of said speed drives as aforesaid; conduit means for connecting said motor with the source; a control valve having an element movable to two motor operating positions for determining which speed drive will be established by said motor when operated; means for selecting the motor operating position to which said movable element will be moved; means for moving said movable element by a movement of said treadle in the direction of its normally released engine idling position; a shut-off valve interposed in said conduit between said control valve and source; and means operable at will be an abnormal movement of said treadle for closing said shut-off valve.

22. In control mechanism for a change-speed gearing provided with a member shiftable to two gear meshing positions to thus establish two different speed drives, said gearing being drivingly associated with an internal-combustion engine controlled by a throttle device operated by a foot-treadle; a source of fluid pressure different from atmosphere; a fluid pressure motor operatively connected to shift said shiftable member to establish either of said speed drives as aforesaid; conduit means for connecting said motor with the source; a control valve having an element movable to two motor operating positions for determining which speed drive will be established by said motor when operated; means for selecting the motor operating position to which said movable element will be moved; means for moving said movable element by a movement of said treadle when operated in the direction of its normally released engine idling position; a shut-off valve interposed in said conduit between said control valve and source; and means for opening said shut-off valve by a depressing heel movement of said treadle.

23. In control mechanism for changing the gear driving ratio of a change-speed gear transmission comprising different gear sets, and associated with a motor vehicle internal-combustion engine controlled by a carburetor throttle operated from a pivotally mounted accelerator; means for normally controlling said engine by applying foot-pressure to said accelerator remote from one side of its pivot, said control mechanism also embodying a controlled fluid pressure operated motor for operating said gear sets to change the gear drive thereof including conduit means connecting said motor to a source of fluid pressure different from atmosphere; means for controlling the operation of said motor, a normally closed shut-off valve interposed in said conduit means; and means for opening said shut-off valve to condition said controlling means for operating said motor by applying foot-pressure to said accelerator remote from the opposite side of its pivot and thereby render its engine controlling function ineffective.

24. In control mechanism for changing the gear ratio drives of a change-speed gearing drivingly associated with a motor vehicle controlled by an engine throttle, and in which said control mechanism embodies a fluid pressure motor for changing the gear drives and conduit means between said motor and a source of fluid pressure different from atmosphere; a normally closed shut-off valve interposed in said conduit means, a movable accelerator; means for opening said shut-off valve by a movement of the heel-end of said accelerator; means operable when said shut-off valve is opened to accommodate a predetermined movement of said accelerator beyond normally released engine idling position; and means for locking said shut-off valve open when said accelerator is in said predetermined position.

25. In control mechanism for a change-speed gear drive transmission associated with a motor vehicle having an engine controlling accelerator mechanism including a control rod actuated by a treadle, said control mechanism embodying a fluid pressure motor for changing the transmission gear drive and conduit means between said motor and a source of fluid pressure different from atmosphere; a normally closed shut-off valve interposed in said conduit means and having a movable element, means for moving said valve element to open position by actuating said treadle; and means associated with said control rod for maintaining said valve element open until said treadle is initially depressed from its fully released engine idling position to accelerate said engine.

26. In control mechanism for a change-speed gear drive transmission associated with a motor vehicle having an engine controlling accelerator mechanism including a control rod actuated by a treadle, said control mechanism embodying a fluid pressure motor for changing the transmission drive and conduit means between said motor and a source of fluid pressure different from atmosphere; a normally closed shut-off valve interposed in said conduit means and having a movable element; means for moving said valve element to open position by actuating said treadle; means associated with said treadle controlled rod for accommodating movement thereof in unison with said treadle when actuated from a normally released engine idling position thereof, and for maintaining said valve element open until said treadle is initially depressed to move said control rod and thus actuate said accelerator mechanism to increase engine speed above the aforesaid idling speed; and means operable by said treadle for controlling an element of said control mechanism.

27. In control mechanism for a change-speed gearing provided with a member shiftable to two gear meshing positions to thereby establish two different gear ratio drives; a source of fluid pressure different from atmosphere; a fluid pressure motor operatively connected to shift said shiftable member selectively to establish said gear drives; conduit means for connecting said motor and source; a control valve having an element movable to two motor operating positions for determining which gear drive will be established by said motor when operated; means for selecting the operating position to which said valve element will be moved; a second fluid pressure motor interposed in said conduit means for moving said valve element to its selected operating position; a shut-off valve interposed in said conduit means for controlling the operation of both motors; and operator-operable means for opening said shut-off valve.

28. In control mechanism for a change-speed gearing provided with a member shiftable to two gear meshing positions to thereby establish two different gear ratio drives, said gearing being drivingly associated with a vehicle engine clutch and means for disengaging said clutch; a source of fluid pressure different from atmosphere; a fluid pressure motor operatively connected to shift said shiftable member to establish said gear drives; conduit means for connecting said motor and source; a control valve having an element movable to two motor operating positions for determining which gear drive said motor will establish when operated; means for selecting the operating position to which said valve element will be moved; a second fluid pressure motor interposed in said conduit means for moving said valve element to its selected operating position; a shut-off valve interposed in said conduit means for controlling the operation of both motors, and means for opening said shut-off valve when said clutch is disengaged by its said disengaging means.

29. In control mechanism for a change-speed gearing provided with a member shiftable to two gear meshing positions to thereby establish two different gear ratio drives, said gearing being drivingly associated with an internal-combustion engine controlled by an accelerator mechanism; a source of fluid pressure different from atmosphere; a fluid pressure motor operatively connected to shift said shiftable member selectively to establish said gear drives; conduit means for connecting said motor with the source; a control valve interposed in said conduit means and having an element movable selectively to two motor operating positions for determining which gear drive said motor will establish when operated; means for selecting the operating position to which said valve element will be moved; a second fluid pressure motor interposed in said conduit means for moving said valve element to its selected operating position; a shut-off valve interposed in said conduit means for controlling the operation of both motors; and means for opening said shut-off valve when said accelerator is released to engine idling position, and to close said shut-off valve when said accelerator is moved to accelerate said engine above idling speed.

30. In control mechanism for a change-speed gearing provided with a member shiftable to two gear meshing positions to thereby establish two different gear ratio drives, said gearing being drivingly associated with a disengageable friction clutch and an internal-combustion engine controlled by an accelerator mechanism; means for disengaging said clutch; a source of fluid pressure different from atmosphere; a fluid pressure motor operatively connected to shift said shiftable member selectively to establish said gear drives; conduit means for connecting said motor with the source; a control valve interposed in said conduit means and having an element movable selectively to two motor operating positions for determining which gear drive said motor will establish when operated; means for selecting the position to which said valve element will be moved; a second fluid pressure motor interposed in said conduit means and for moving said control valve to its selected operating position; a shut-off valve interposed in said conduit means for controlling the operation of both motors; means for opening said shut-off valve when said accelerator is in a predetermined engine controlling position; a second shut-off valve interposed in said conduit means; and means operable for opening said second shut-off valve when said clutch is disengaged by its said disengaging means.

31. In control mechanism for a changeable gear ratio drive transmission provided with a member shiftable to change the gear drive thereof, and being drivingly associated with an internal-combustion engine controlled by a movable accelerator mechanism; a source of fluid pressure different from atmosphere; a fluid pressure motor operatively connected to shift the shiftable member to change the gear drive of said transmission; conduit means for connecting said motor with the source; a control valve interposed in said conduit means and having an element movable selectively to two motor operating positions for determining which gear drive will be changed by said motor when operated; means for selecting the operating position to which said valve element will be moved; a second fluid pressure motor connected to said source for moving said valve element to its selected operating position; a shut-off valve interposed in said conduit means for controlling the operation of both motors; and means for opening said shut-off valve in response to a predetermined movement of said accelerator.

32. In control mechanism for a change-speed transmission having at least two gear sets provided with a member shiftable to two positions to establish to different gear drives, said transmission being associated with an internal-combustion engine controlled by an accelerator-operated carburetor throttle; energizable motor-power means operable for shifting said member to either of its gear drive establishing positions; means for energizing said motor including a control element selectively movable to two motor energizing positions for determining which gear drive said motor will establish when operated; selecting means controllable for predetermining to which energizing position said control element will be moved; means operable in response to a shifting movement of said shiftable member for controlling said selecting means; a movable actuating member for moving said control element; and means controlled by said accelerator during an engine controlling operation thereof, for causing said actuating member to move said control element to its selected energizing position.

33. In a control mechanism for a change-speed multiple gear drive transmission associated with a motor vehicle having an engine controlling accelerator mechanism, said control mechanism embodying a fluid motor for changing the gear drive and conduit means between said motor and a source of fluid pressure different from atmospheric pressure; two shut-off valves associated with said conduit means, one of said valves comprising a sleeve valve element and the other of said valves comprising a spool valve element movably mounted within said sleeve valve element, said valve elements being provided with passages whereby when said valve elements are in predetermined positions, communication is established through the conduit means and when either valve is moved relatively with respect to the other from its predetermined position, the communication through the conduit will be cut off, one of said valves being arranged to be controlled by an engine controlling operation of said accelerator mechanism and the other by an independent manually-operated member.

34. In control mechanism for a change-speed gear drive provided with a member shiftable to two positions to establish only two different gear drives, a source of fluid pressure different from atmosphere, a fluid pressure operated motor operatively connected to shift said shiftable member to either of its gear drive establishing positions, conduit means between said motor and said source of fluid pressure, a control valve associated with said conduit means and an element movable to two different open positions for controlling the operation of said motor, selecting means controlled by movement of said shiftable member for predetermining to which open position said valve element will be moved, means including a second fluid pressure operated motor associated with said conduit means and operable for moving said control valve element to either of its said open positions, and valve means for controlling the operativeness of said second fluid motor.

35. In control mechanism for a change-speed multiple gear drive provided with a member shiftable to two positions to establish only two different gear drives, a source of fluid pressure different from atmosphere, a fluid pressure operated motor operatively connected to shift said shifting member to either of its drive establishing positions, conduit means between said motor and source, a control valve associated with said conduit means and having an element selectively movable to two different open positions for controlling the operation of said motor, means controlled by the movement of said shiftable member and comprising an oscillatable member for selecting to which position said valve element will be moved, a second fluid pressure operated motor associated with said conduit means and controlled by the oscillatable member for moving said valve element to either of its open positions, and other valve means controlled by said oscillatable member for controlling the operativeness of said second fluid motor.

36. In control mechanism for a change-speed transmission having at least two gear sets provided with a member shiftable to two positions to establish two different gear ratio drives, said transmission being associated with an internal-combustion engine controllable by an accelerator-operated throttle valve, a manually-operated member; a fluid pressure servomotor operatively connected to shift said shiftable member to either of its gear drive establishing positions; a source of fluid pressure different from atmosphere; conduit means for connecting the servomotor to said source; a control valve movable to two servomotor-controlling positions, said valve being interposed in said conduit; dual shut-off valves interposed in said conduit between said control valve and source and effective when open to place said source in communication with said control valve; means for controlling the opening of one of said shut-off valves by said manually-operated member; and means for controlling the opening of the other shut-off valve and the aforementioned control valve to either of its motor-controlling positions by said accelerator during engine controlling operations thereof to cause the servomotor to operate to change the effective gear drive of the transmission.

37. A transmission control mechanism according to claim 36 including a pedal and a third shut-off valve interposed between the source and the aforementioned dual shut-off valves, said last-named shut-off valve being controlled by said pedal to open position when said pedal is moved to a predetermined position, for placing the source in communication with said dual shut-off valves.

GLENN T. RANDOL.

(References on following page)

REFERENCES CITED

The following references are of record in the file of this patent:

UNITED STATES PATENTS

| Number | Name | Date |
|---|---|---|
| 1,966,865 | Linsley | July 17, 1934 |
| 2,013,388 | Lacey | Sept. 3, 1935 |
| 2,062,104 | Prince | Nov. 24, 1936 |
| 2,085,257 | Getaz | June 29, 1937 |
| 2,109,443 | Hill et al. | Feb. 22, 1938 |
| 2,115,097 | Durham | Apr. 26, 1938 |
| 2,163,880 | Houston et al. | June 27, 1939 |
| 2,169,216 | Bloxsom | Aug. 15, 1939 |
| 2,181,471 | Velo | Nov. 28, 1939 |
| 2,208,828 | Adams | July 23, 1940 |
| 2,261,898 | Barkeij | Nov. 4, 1941 |
| 2,263,400 | Schwarz | Nov. 18, 1941 |
| 2,264,001 | McKechnie | Nov. 25, 1941 |
| 2,287,272 | Price et al. | June 23, 1942 |
| 2,292,253 | Thurber | Aug. 4, 1942 |
| 2,348,435 | Hey et al. | May 9, 1944 |
| 2,351,067 | Randol | June 13, 1944 |
| 2,388,357 | Hewitt | Nov. 6, 1945 |
| 2,422,596 | Stevens | June 17, 1947 |
| 2,493,030 | Randol | Jan. 3, 1950 |